(12) United States Patent
Lin et al.

(10) Patent No.: US 9,082,315 B2
(45) Date of Patent: Jul. 14, 2015

(54) SURROUNDING BIRD VIEW MONITORING IMAGE GENERATION METHOD AND TRAINING METHOD, AUTOMOBILE-SIDE DEVICE, AND TRAINING DEVICE THEREOF

(71) Applicant: INDUSTRIAL TECHNOLOGY RESEARCH INSTITUTE, Hsinchu (TW)

(72) Inventors: Yu-Chen Lin, Taipei (TW); Che-Tsung Lin, Hsinchu (TW); Ming-Jen Tu, Taipei (TW); Li-Fen Liu, Zhubei (TW); Hsin-Liang Shen, Douliu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 456 days.

(21) Appl. No.: 13/706,432

(22) Filed: Dec. 6, 2012

(65) Prior Publication Data

US 2013/0236858 A1  Sep. 12, 2013

(30) Foreign Application Priority Data

Mar. 8, 2012 (TW) ................................. 101107971

(51) Int. Cl.
*G09B 9/052* (2006.01)
*G09B 19/16* (2006.01)
*G09B 9/042* (2006.01)

(52) U.S. Cl.
CPC .............. *G09B 19/167* (2013.01); *G09B 9/042* (2013.01); *G09B 9/052* (2013.01)

(58) Field of Classification Search
None
See application file for complete search history.

(56) References Cited

U.S. PATENT DOCUMENTS

| | | |
|---|---|---|
| 6,200,139 B1 | 3/2001 | Clapper |
| 6,970,184 B2 | 11/2005 | Hirama et al. |
| 7,974,444 B2 | 7/2011 | Hongo |

(Continued)

FOREIGN PATENT DOCUMENTS

| | | |
|---|---|---|
| CN | 1921621 | 2/2007 |
| CN | 1921621 A | 2/2007 |

(Continued)

OTHER PUBLICATIONS

TW Office Action dated Oct. 2, 2014.
(Continued)

*Primary Examiner* — William C Vaughn, Jr.
*Assistant Examiner* — Eileen Adams
(74) *Attorney, Agent, or Firm* — McClure, Qualey & Rodack, LLP

(57) ABSTRACT

A surrounding bird view image generation method for use in an automobile-side device of an articulated vehicle is provided. The articulated vehicle includes a first body part, a second body part and a connection part. The proceeding directions of the first and the second body parts form an angle. The image processing method includes the steps of: storing an angle-to-surrounding-image model table; detecting an angle and providing an angle measurement; accessing the angle-to-surrounding-image model table to obtain a selected angle and a selected surrounding image model corresponding to the angle measurement; capturing 6 adjacent images corresponding to the surrounding of the vehicle body by the image capturers disposed on the 6 surrounding sides of the articulated vehicle; obtaining a practical operating surrounding image by processing the first to the sixth images with the selected surrounding image model.

20 Claims, 17 Drawing Sheets

(56) References Cited

U.S. PATENT DOCUMENTS

| | | |
|---|---|---|
| 8,044,779 B2 | 10/2011 | Hahn et al. |
| 8,242,895 B2 | 8/2012 | Shen et al. |
| 2002/0113873 A1 | 8/2002 | Williams |
| 2007/0122058 A1 | 5/2007 | Kitaura et al. |
| 2008/0044061 A1 | 2/2008 | Hongo |
| 2008/0304705 A1 | 12/2008 | Pomerleau et al. |
| 2010/0007478 A1 | 1/2010 | Hahn et al. |
| 2010/0033553 A1 | 2/2010 | Levy |
| 2010/0171828 A1 | 7/2010 | Ishii |
| 2010/0194851 A1 | 8/2010 | Pasupaleti et al. |
| 2011/0157361 A1 | 6/2011 | Wu et al. |

FOREIGN PATENT DOCUMENTS

| | | |
|---|---|---|
| CN | 101132536 A | 2/2008 |
| CN | 101175972 | 5/2008 |
| CN | 101408423 A | 4/2009 |
| CN | 102137247 A | 7/2011 |
| CN | 102142138 A | 8/2011 |
| CN | 202038230 U | 11/2011 |
| DE | 102008030104 | 2/2009 |
| DE | 102008035428 | 2/2010 |
| EP | 1892150 | 2/2008 |
| EP | 2181898 | 5/2010 |
| JP | 2006054662 A | 2/2006 |
| JP | 2008151934 A | 7/2008 |
| JP | 2008279148 A | 11/2008 |
| JP | 2009244660 A | 10/2009 |
| TW | 440807 | 6/2001 |
| TW | 200523148 | 7/2005 |
| TW | I267806 | 12/2006 |
| TW | M365288 | 9/2009 |
| TW | 201103786 A | 2/2011 |
| WO | 2009031400 | 12/2009 |

OTHER PUBLICATIONS

CN Office Action dated Oct. 10, 2014.
Full English (machine) translation of CN102142138 (Published Aug. 3, 2011).
Full English (machine) translation of CN1921621 (Published Feb. 28, 2007).
English Abstract translation of TW201103786 (Published Feb. 1, 2011).
English Abstract translation of JP2009244660 (Published Oct. 22, 2009).
English Abstract translation of JP2008279148 (Published Nov. 20, 2008).
English Abstract translation of JP2008151934 (Published Jul. 3, 2008).
English Abstract translation of CN102137247 (Published Jul. 27, 2011).
English Abstract translation of CN101408423 (Published Apr. 15, 2009).
English Abstract translation of CN202038230 (Published Nov. 16, 2011).
English Abstract translation of JP2006054662 (Published Feb. 23, 2006).
English language translation of abstract of TW200523148 (Published Jul. 16, 2005).
English language translation of abstract of TWM365288 (Published Sep. 21, 2009).
English language translation of abstract of CN1921621 (Published Feb. 28, 2007).
English language translation of abstract of CN101175972 (Published May 7, 2008).
English language translation of abstract of DE102008030104 (Published Feb. 12, 2009).
English language translation of abstract of DE102008035428 (Published Feb. 4, 2010).
Ehlgen, et al.; "Monitoring surrounding areas of truck-trailer combinations;" Daimler-Chrysler Research and Technology, Ulm tobias.ehlgen@daimlerchrysler.com 2 Center of Machine Perception, Technical University, Prague pajdla@cmp.felk.cvut.cz; pp. 1-10.
Ehlgen, et al.; "Maneuvering Aid for Large Vehicle using Omnidirectional Cameras;" Daimler-Chrysler Research and Technology, Ulm tobias.ehlgen@daimlerchrysler.com 2 Center of Machine Perception, Technical University, Prague pajdla@cmp.felk.cvut.cz; pp. 1-6.
"Stereo Vision-Based Start-Inhibit for Heavy Goods Vehicles"; Intelligent Vehicles Symposium 2006, Jun. 13-15, 2006, Tokyo, Japan; pp. 1-6.
Gandhi, et al.; "Motion Based Vehicle Surround Analysis Using an Omni-Directional Camera;" Tarak Gandhi and Mohan M. Trivedi Computer Vision and Robotics Research Laboratory University of California at San Diego, USA ftgandhi,mtrivedig@ucsd.edu http://cvrr.ucsd.edu; pp. 1-6.
Gandhi, et al.; "Dynamic Panoramic Surround Map: Motivation and Omni Video Based Approach;" Tarak Gandhi and Mohan M. Trivedi Computer Vision and Robotics Research Laboratory University of California at San Diego, USA ftgandhi,mtrivedig@ucsd.edu http://cvrr.ucsd.edu; pp. 1-8.
Ehlgen, et al.; "Eliminating Blind Spots for Assisted Driving;" IEEE Transactions on Intelligent Transportation Systems, vol. 9, No. 4, Dec. 2008; pp. 1-9.
Terzis, et al.; "Characterization of UWB Video Transmission Channels in Reflective Environment between a Truck and its Trailer;" Proceedings of the 1st European Wireless Technology Conference; Oct. 2008, Amsterdam, The Netherlands; pp. 1-4.

SURROUNDING BIRD VIEW MONITORING IMAGE GENERATION METHOD AND TRAINING METHOD, AUTOMOBILE-SIDE DEVICE, AND TRAINING DEVICE THEREOF

This application claims the benefit of Taiwan application Serial No. 101107971, filed Mar. 8, 2012, the disclosure of which is incorporated by reference herein in its entirety.

TECHNICAL FIELD

The disclosure relates in general to a training method and a corresponding surrounding bird view image generation method, and more particularly to a training method and a surrounding bird view image generation method for use in an articulated vehicle.

BACKGROUND

With the rapid advance and development in technology, various driving aids are provided to enhance transport safety. Due to the specific structure of the articulated body, the driver of the articulated vehicle has to tackle with the problems such as the difference of radius between inner wheels being too large when the vehicle makes a U-turn and the blind spots being too many. Therefore, how to provide suitable driving aids for use in the articulated vehicle for reducing driving difficulty and increasing transport safety has become a prominent task for the industries.

SUMMARY

According to a first aspect of the disclosure, a training system for use in an articulated vehicle is provided. The articulated vehicle includes a first body part, a second body part and a connection part. The proceeding direction of the first body part forms an angle with respect to the proceeding direction of the second body part. The first body part includes a first connection surface, a first surface, a second surface and a sixth surface. The first surface is opposite to the first connection surface and adjacent to the second and the sixth surfaces. The second body part includes a second connection surface, a third surface, a fourth surface and a fifth surface. The second connection surface is connected to the first connection surface via the connection part. The fourth surface is opposite to the second connection surface and adjacent to the third and the fifth surfaces. The second surface is adjacent to the third surface. The fifth surface is adjacent to the sixth surface. The first to the sixth image capturers are respectively disposed on the first to the sixth surfaces for capturing the first to the sixth images. The first image partly overlaps the second and the sixth images. The fourth image partly overlaps the third and the fifth images. The second image partly overlaps the third image. The fifth image partly overlaps the sixth image. The training system includes an automobile-side device and a training device. The training device is connected to the articulated vehicle in a training stage, and includes a movable carrier, a feature point unit and a control unit. The movable carrier moves one of the first and the second body parts to adjust the angle such that the angle corresponds to an i-th training angle of N training angles, wherein i is an integral smaller than or equal to N. When the angle corresponds to the i-th training angle, the feature point unit provides at least one feature point associated with the overlapping capturing region between any two of the first to the sixth images, such that the any two images correspondingly show the first and the second feature points. The control unit determines N training angles so as to correspondingly drive the movable carrier. The control unit receives the first to the sixth images provided by the processing unit, and respectively records two coordinate sets of the first and the second feature points in any two images to construct an i-th feature point comparison table with respect to the i-th training angle. The control unit further constructs an i-th surrounding image model according to the i-th feature point comparison table so as to perform a training process with respect to the i-th training angle. The control unit further adjusts the parameter i to obtain N surrounding image models respectively corresponding to the N training angles in the training stage and provide the N surrounding image models to the automobile-side device.

According to a second aspect of the disclosure, an automobile-side device for use in an articulated vehicle for correspondingly providing a practical operating surrounding image is provided. The articulated vehicle includes a first body part, a second body part and a connection part, wherein the proceeding direction of the first body part forms an angle with respect to the proceeding direction of the second body part. The first body part includes a first connection surface, a first surface, a second surface and a sixth surface. The first surface is opposite to the first connection surface and adjacent to the second and the sixth surfaces. The second body part includes a second connection surface, a third surface, a fourth surface and a fifth surface. The second connection surface is connected to the first connection surface via the connection part. The fourth surface is opposite to the second connection surface and adjacent to the third and the fifth surfaces. The second surface is adjacent to the third surface. The fifth surface is adjacent to the sixth surface. The first to the sixth image capturers are respectively disposed on the first to the sixth surfaces for capturing the first to the sixth images. The first image partly overlaps the second and the sixth images. The fourth image partly overlaps the third and the fifth images. The second partly overlaps the third image. The fifth partly overlaps the sixth image. The automobile-side device includes a processing unit, a memory unit, an angle detection unit and a processing unit. The memory unit stores the angle-to-surrounding-image model table, which comprises N training angles and the N surrounding image models corresponding to the N training angles, wherein N is an integral greater than 1. The angle detection unit detects an angle and correspondingly provides an angle measurement. The processing unit accesses the angle-to-surrounding-image model table so as to obtain a selected training angle closest to the angle measurement from the N training angles, and obtain a selected surrounding image model corresponding to the selected training angle from the N surrounding image models. The processing unit further receives the first to the sixth practical captured images, and obtains the practical operating surrounding images by processing the first to the sixth practical captured images with the selected surrounding image model.

According to a third aspect and a fourth aspect, a training method and a surrounding bird view image generation method are respectively provided. The technologies of the third aspect and the fourth aspect correspond to that of the first and the second aspect of the disclosure.

Figure 1:
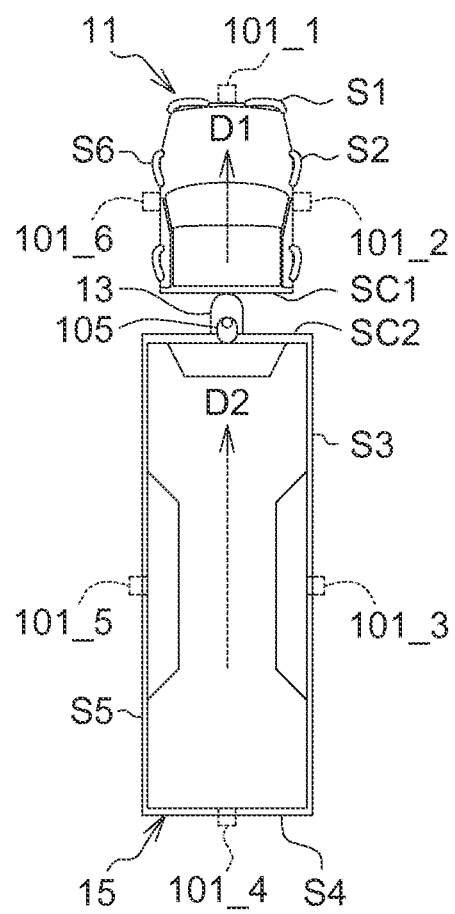
FIG. 1 shows a schematic diagram of an articulated vehicle according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The training system of the embodiment of the disclosure includes an automobile-side device and a training device. The automobile-side device is disposed on the articulated vehicle, which may be selectively realized by such as an articulated bus, a low bed trailer or a container truck.

Automobile-Side Device:

Referring to FIG. 1, a schematic diagram of an articulated vehicle according to an embodiment of the disclosure is shown. The automobile-side device 1000 of the embodiment of the disclosure is disposed on an articulated vehicle 100 for providing a surrounding image, such as a surrounding bird view image. For example, the articulated vehicle 100 of the embodiment of the disclosure includes a first body part 11, a second body part 15 and a connection part 13. The first and the second body parts 11 and 15, such as a tractor and a trailer respectively, are interconnected via the connection part 13. The first and the second body parts 11 and 15 respectively have proceeding directions D1 and D2, wherein the proceeding direction D1 forms an angle θ with respect to the proceeding direction D2.

Furthermore, the first body part 11 includes a connection surface SC1, and surfaces S1, S2 and S6. The connection surface SC1 is connected to the connection part 13. The surface S1 is opposite and substantially parallel to the connection surface SC1. The connection surface SC1 is adjacent and substantially perpendicular to the surfaces S2 and S6. For example, the surfaces 51, S2 and S6 respectively are the front bumper surface, the right-hand surface and the left-hand surface of the tractor. The second body part 15 includes a connection surface SC2, and surfaces S3, S4 and S5. The connection surface SC2 is connected to the connection surface SC1 via the connection part 13. The surface S4 is opposite and substantially parallel to the connection surface SC2, and is adjacent and substantially perpendicular to the surfaces S3 and S5. For example, the surfaces S4, S3, and S5 respectively are the rear bumper surface, the right-hand and the left-hand surface of the trailer. The image capturers 101_1~101_6 are respectively disposed on the surfaces S1~S6.

Figure 2:
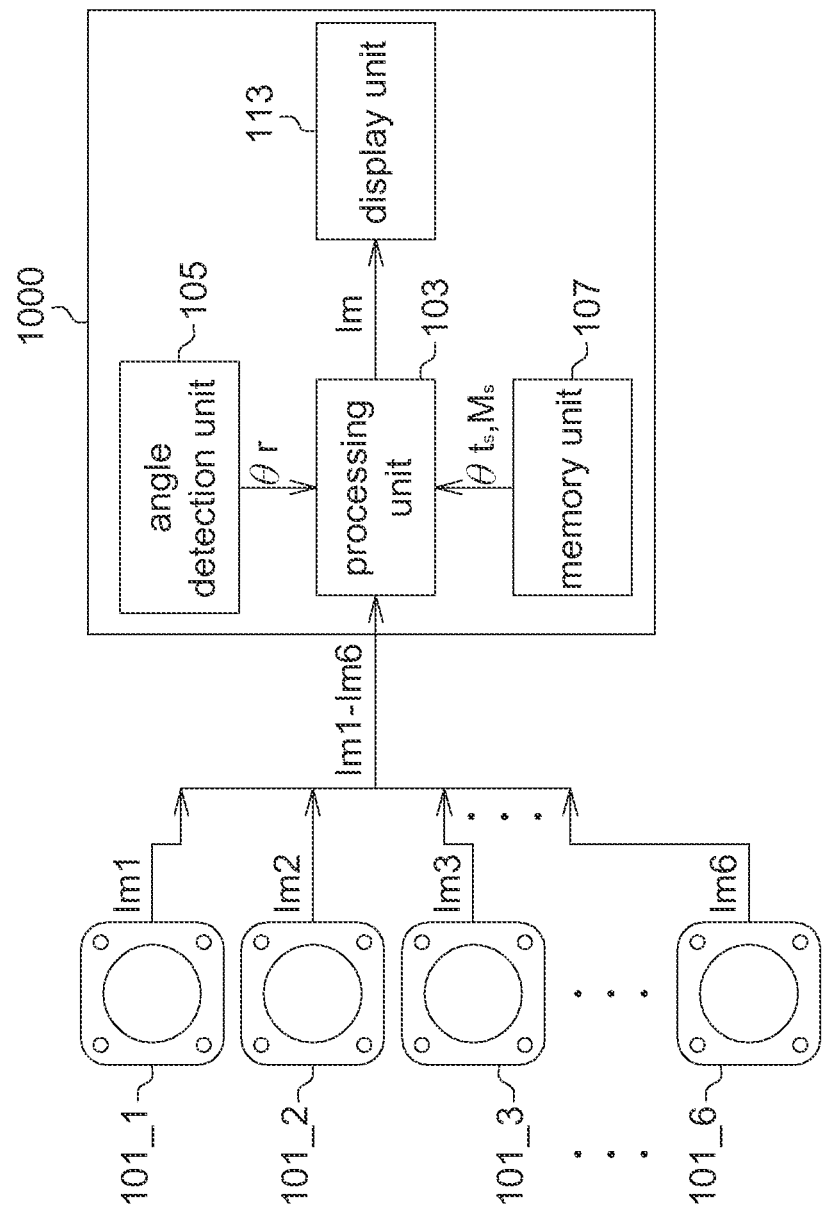
FIG. 2 shows a block diagram of an automobile-side device according to an embodiment of the disclosure.

Referring to FIG. 2, a block diagram of an automobile-side device according to an embodiment of the disclosure is shown. The automobile-side device 1000 further includes a processing unit 103, an angle detection unit 105, a memory unit 107 and a display unit 113. For example, the processing unit 103, the memory unit 107 and the display unit 113 are disposed at the physical position of the driver seat of the first body part 11. The image capturers 101_1~101_6 are connected to the processing unit 103 via a physical element of the articulated vehicle 100 or wireless communication.

Furthermore, the image capturers 101_1, 101_2 and 101_6 are respectively disposed on the surfaces S1, S2 and S6 for capturing first, second and sixth practical captured images Im1, Im2 and Im6 respectively. For example, the image capturers 101_1, 101_2 and 101_6 are respectively disposed on the front bumper, under the right-hand rear-vision mirror and under the left-hand rear-vision mirror of the tractor. The image capturers 101_3, 101_4 and 101_5 are respectively disposed on surfaces S3, S4 and S5 for respectively capturing third, fourth and fifth practical captured images Im3, Im4 and Im5. For example, the image capturers 101_4, 101_3 and 101_5 are respectively disposed on the rear bumper, the right-hand vehicle body and the left-hand vehicle body of the trailer.

Figure 3:
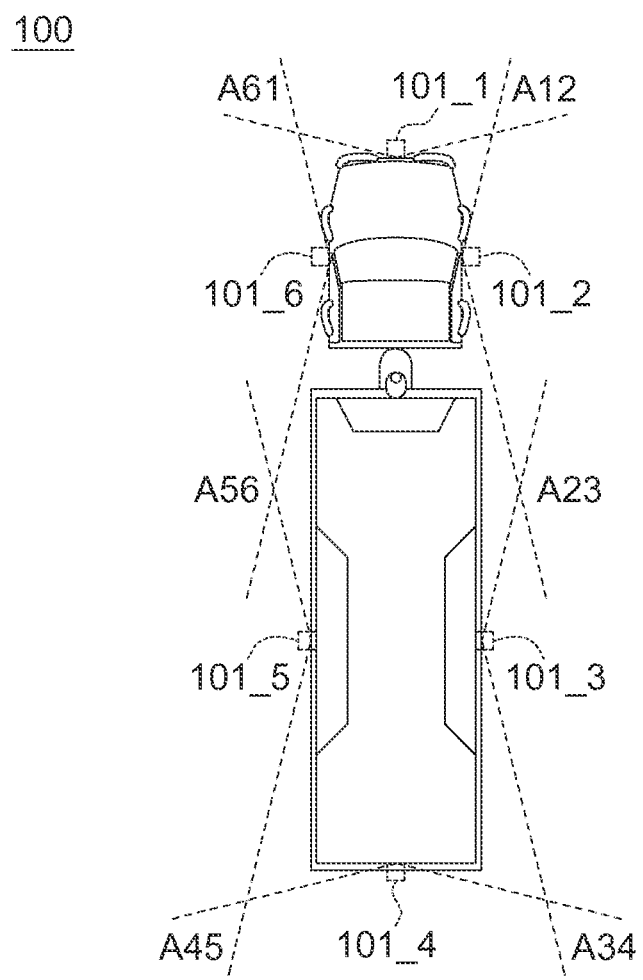
FIG. 3 shows another schematic diagram of an articulated vehicle according to an embodiment of the disclosure.

Referring to FIG. 3, another schematic diagram of an articulated vehicle according to an embodiment of the disclosure is shown. The image capturers 101_1~101_6 are such as fisheye lenses. The images captured by two adjacent image capturers disposed on two adjacent surfaces (such as surfaces S1 and S2, surfaces S2 and S3, surfaces S3 and S4, surfaces S4 and S5, surfaces S5 and S6, and surfaces S6 and S1) are partly overlapped with each other. Let the first and the second practical captured images Im1 and Im2 captured by the image capturers 101_1 and 101_2 be taken for example. The horizontal view angles of the first and the second practical captured images Im1 and Im2 are substantially greater than or equal to 130°, and the image capturers 101_1 and 101_2 are respectively disposed on the surfaces S1 and S2 substantially perpendicular to each other. Thus, the object in the overlapping capturing region A12 is concurrently displayed on the first and the second practical captured images Im1 and Im2 captured by the image capturers 101_1 and 101_2. In other words, the first and the second practical captured images Im1 and Im2 have an overlapping capturing region A12.

Likewise, the second and the third practical captured images Im2 and Im3, the third and the fourth practical captured images Im3 and Im4, the fourth and the fifth practical captured images Im4 and Im5, the fifth and the sixth practical captured images Im5 and Im6, and the sixth and the first practical captured images Im6 and Im1 have overlapping capturing regions A23, A34, A45, A56 and A61 respectively.

Figure 15:
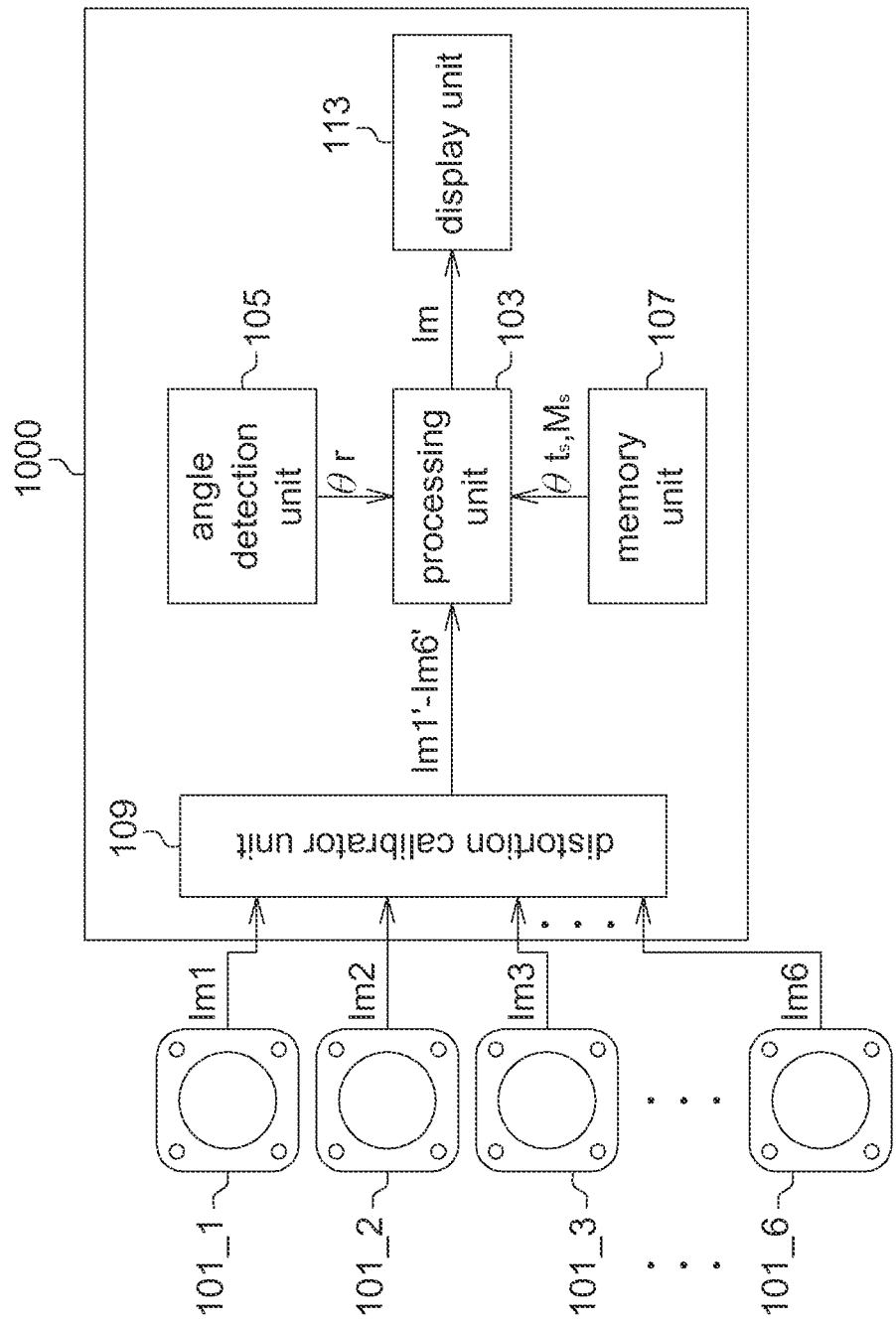
FIG. 15 shows a block diagram of an automobile-side device according to another embodiment of the disclosure.

Refer to FIG. 15. In other implementations, the automobile-side device 1000 further includes a distortion calibration unit 109, disposed at the physical position of the driver seat of the first body part 11, for example. The image capturers 101_1~101_6 are connected to the distortion calibration unit 109 and the processing unit 103 via a physical element of the articulated vehicle 100 or wireless communication. The distortion calibration unit 109 receives and performs a distortion calibration process on the first to the sixth practical captured images Im1~Im6. The distortion calibration unit 109 further provides the first to the sixth calibrated practical captured images Im1'~Im6' to the processing unit 103. For example, the distortion calibration unit 109 may be realized by a physical circuit, such as an embedded processor or other circuits. In other examples, the distortion calibration unit 109 may also be realized in the manner of software, and correspondingly stored in a computer readable medium such as a random access memory, a read-only memory or a non-volatile memory. The processing unit 103 correspondingly accesses the computer readable medium to calibrate the distortion of the corresponding image.

The angle detection unit 105 may be selectively realized by some or all of an optical encoder, a potentiometer, a rotational variable difference transformer, a gyro sensor, an image type angle sensor. For example, the angle detection unit 105 is disposed on the connection part 13 for detecting an angle θ between the proceeding direction D1 of the first body part 11 and the proceeding direction of D2 of the second body part 15. The angle detection unit 105 may also be is connected to the processing unit 103 via a physical element of the articulated vehicle 100 or wireless communication, and provides an angle measurement θr corresponding to the angle θ.

The memory unit 107 stores and provides the angle-to-surrounding-image model table, which records N training angles θt_1, θt_2, . . . , θt_N and N corresponding surrounding image models M_1, M_2, . . . , M_N, wherein N is an integral greater than 1, and N training angles θt_1~θt_N cover possible numeric ranges of the angle θ. For example, the angle θ ranges from −90° (the first body part 11 turns to the left by 90°) to +90° (the first body part 11 turns to the right by 90°), wherein N is equal to 37, and the training angles θt_1~θt_N have a unit step of 5° and cover −90°, −85°, −80°, . . . , −5°, 0°, +5°, +10°, . . . , +90°.

The processing unit 103 receives the angle measurement θr, and accordingly accesses the memory unit 107 so as to obtain a selected training angle θts closest to the angle measurement θr from the N training angles θt_1~θt_N and obtain a selected surrounding image model Ms corresponding to the selected training angle θts. In an example, the angle measurement θr is equal to 3°, and the processing unit 103 uses the 36-th training angle θt_36 (such as 5°) closest to the angle measurement θr from the training angles θt_1~θt_N (such as corresponding to physical angle −90°, −85°, . . . , +90° respectively) as a selected training angle θts, and uses the 36-th surrounding image models M_36 corresponding to the 36-th training angles θt_36 as a selected surrounding image model Ms.

The processing unit 103 further receives the first to the sixth calibrated practical captured images Im1'~Im6', and obtains the practical operating surrounding image Im of the articulated vehicle 100 by processing the first to the sixth practical captured images Im1'~Im6' with the selected surrounding image model Ms. The processing unit 103 further provides the practical operating surrounding image Im to the display unit 113 and drives the display unit 113 to display the practical operating surrounding image Im. Thus, the articulated vehicle 100 grabs the relationship between the articulated vehicle 100 and its environment more effectively with reference to the practical operating surrounding image Im.

Figure 4:
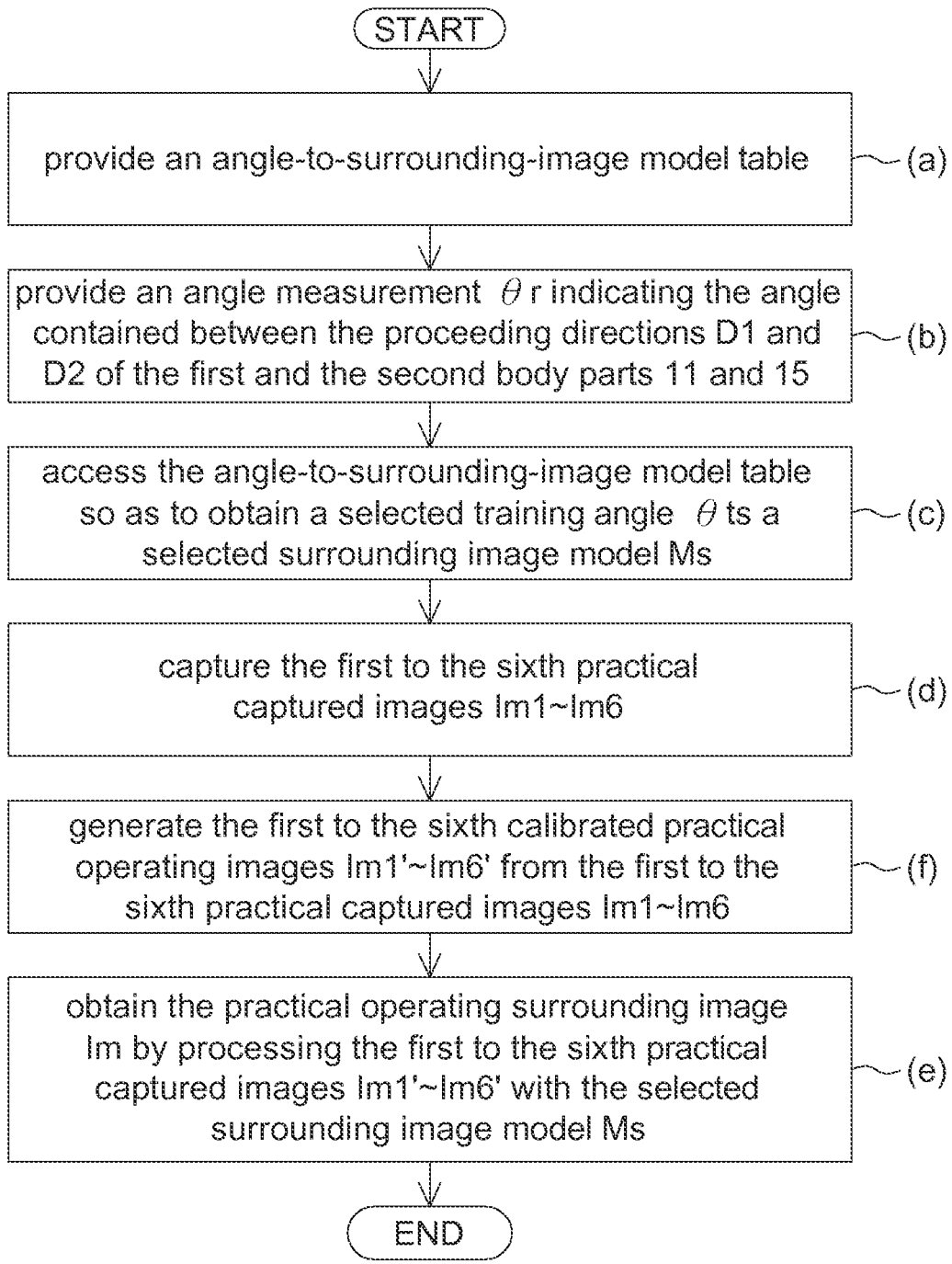
FIG. 4 shows a flowchart of a surrounding bird view image generation method according to an embodiment of the disclosure.

Referring to FIG. 4, a flowchart of a surrounding bird view image generation method according to an embodiment of the disclosure is shown. For example, the surrounding bird view image generation method of the embodiment of the disclosure is for use in an automobile-side device 1000 which is used in an articulated vehicle 100. The surrounding bird view image generation method of the embodiment of the disclosure includes the following steps. Firstly, as indicated in step (a), the memory unit 107 provides an angle-to-surrounding-image model table, which includes N training angles θt_1~θt_N and N corresponding surrounding image models M_1~M_N. Next, as indicated in step (b), the angle detection unit 105 detects an angle θ between the proceeding directions D1 and D2 of the first and the second body parts 11 and 15, and correspondingly provides an angle measurement θr.

Then, as indicated in step (c), the processing unit 103 accesses the angle-to-surrounding-image model table so as to obtain a selected training angle θts closest to the angle measurement θr from N training angles θt_1~θt_N and obtain a selected surrounding image model Ms corresponding to the selected training angle θts from N surrounding image models M_1~M_N. Then, as indicated in step (d), the first to the sixth practical captured images Im1~Im6 are respectively captured by the image capturers 101_1~101_6 disposed on the surfaces S1~S6, wherein any one of the practical captured image Im1~Im6 partly overlaps an adjacent practical captured image.

Then, as indicated in step (e), the processing unit 103 obtains the practical operating surrounding image Im by processing the first to the sixth practical captured images Im1~Im6 with the selected surrounding image model Ms.

For example, the surrounding bird view image generation method of the embodiment of the disclosure further includes step (f) between steps (d) and (e), the distortion calibration unit 109 performs a distortion calibration process on the first to the sixth practical captured images Im1~Im6, and provides the first to the sixth calibrated practical captured images Im1'~Im6' to the processing unit 103. In other words, in step (e) of the surrounding bird view image generation method of the embodiment of the disclosure, the first to the sixth calibrated practical captured images Im1'~Im6' are processed with the selected surrounding image model Ms.

To summarize, the articulated vehicle of the embodiment of the disclosure may use the angle detection unit to detect the angle measurement between the first body part and the second body part. The articulated vehicle of the embodiment of the disclosure may look up the existing angle-to-surrounding-image model table according to the angle measurement to correspondingly select an existing training angle closest to the angle measurement and obtain a selected surrounding image model corresponding to the selected training angle. The articulated vehicle of the embodiment of the disclosure correspondingly captures 6 images via 6 image capturers disposed on the 6 surrounding surfaces of the vehicle body. The articulated vehicle of the embodiment of the disclosure further obtains the practical operating surrounding image corresponding to the articulated vehicle according to the 6 images and the selected surrounding image model. In comparison to the conventional driving aids, the articulated vehicle of the embodiment of the disclosure has the advantage of providing surrounding images to the articulated vehicle more effectively.

Training Device:

For example, the angle-to-surrounding-image model table used by the automobile-side device 1000 of the embodiment of the disclosure is provided by the training device. In the training stage, the training device is connected to the articulated vehicle 100 to perform related training for constructing the angle-to-surrounding-image model table. Detailed descriptions of the training device of the embodiment of the disclosure are disclosed below.

Figure 5:
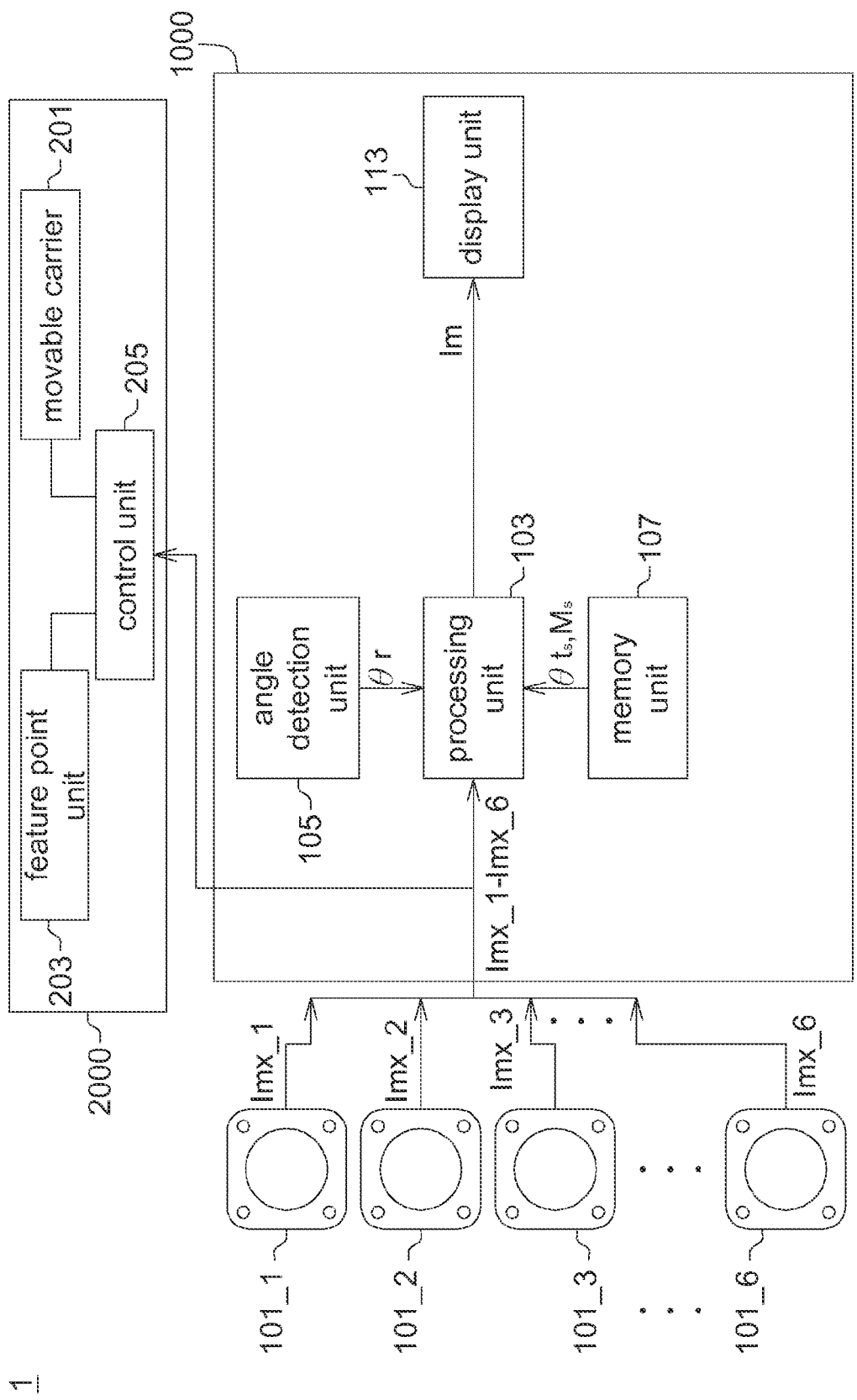
FIG. 5 shows a block diagram of a training system according to an embodiment of the disclosure.

The training device 2000 of the embodiment of the disclosure includes a movable carrier 201, a feature point unit 203 and a control unit 205, wherein the movable carrier 201 and the feature point unit 203 are electrically connected to the control unit 205 respectively. The control unit 205, being the main control element of the training device 2000, is correspondingly connected to the automobile-side device 1000 in the training stage. The connection relationship between the control unit 205 and the automobile-side device 1000 is illustrated in FIG. 5.

Figure 6:
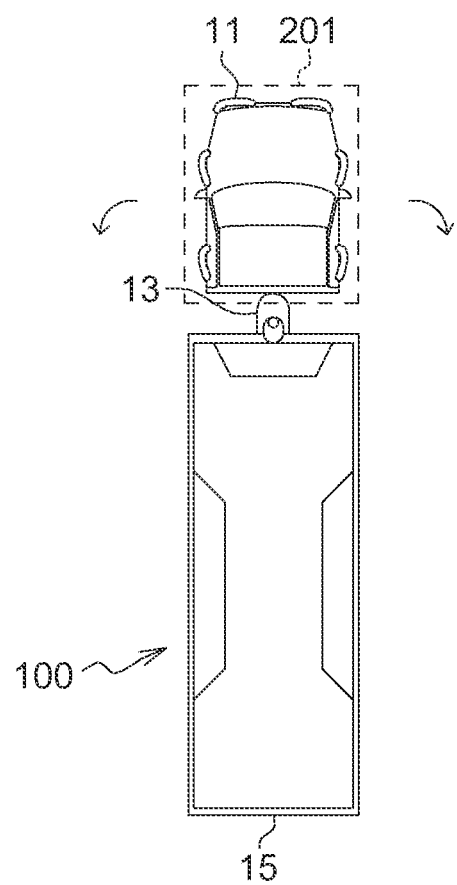
FIG. 6 shows a schematic diagram of a movable carrier 201 according to an embodiment of the disclosure.

The control unit 205 further correspondingly determines N training angles θt_1~θt_N, and accordingly drives the movable carrier 201 to move one of the first and the second body parts 11 and 15 of the articulated vehicle 100 to correspondingly adjust the angle θ, such that the angle θ may selectively correspond to an i-th training angle θt_i of N training angles θt_1~θt_N, wherein i is an integral smaller than or equal to N. Let an operational example be taken for example. The movable carrier 201 carries and makes the first body part 11 rotated to the left and to the right around the connection part 13 to adjust the angle θ correspondingly as indicated in FIG. 6.

When the angle θ is substantially equal to the i-th training angle θt_i, the feature point unit 203 provides at least one feature point associated with the overlapping capturing region (such as overlapping capturing regions A12, A23, A34, A45, A56 and A61) between any two adjacent images of the first to the sixth practical captured images corresponding to the image capturers 101_1~101_6, such that any two adjacent images of the first to the sixth practical captured images respectively show the first and the second feature points corresponding to the feature point.

Figure 7:
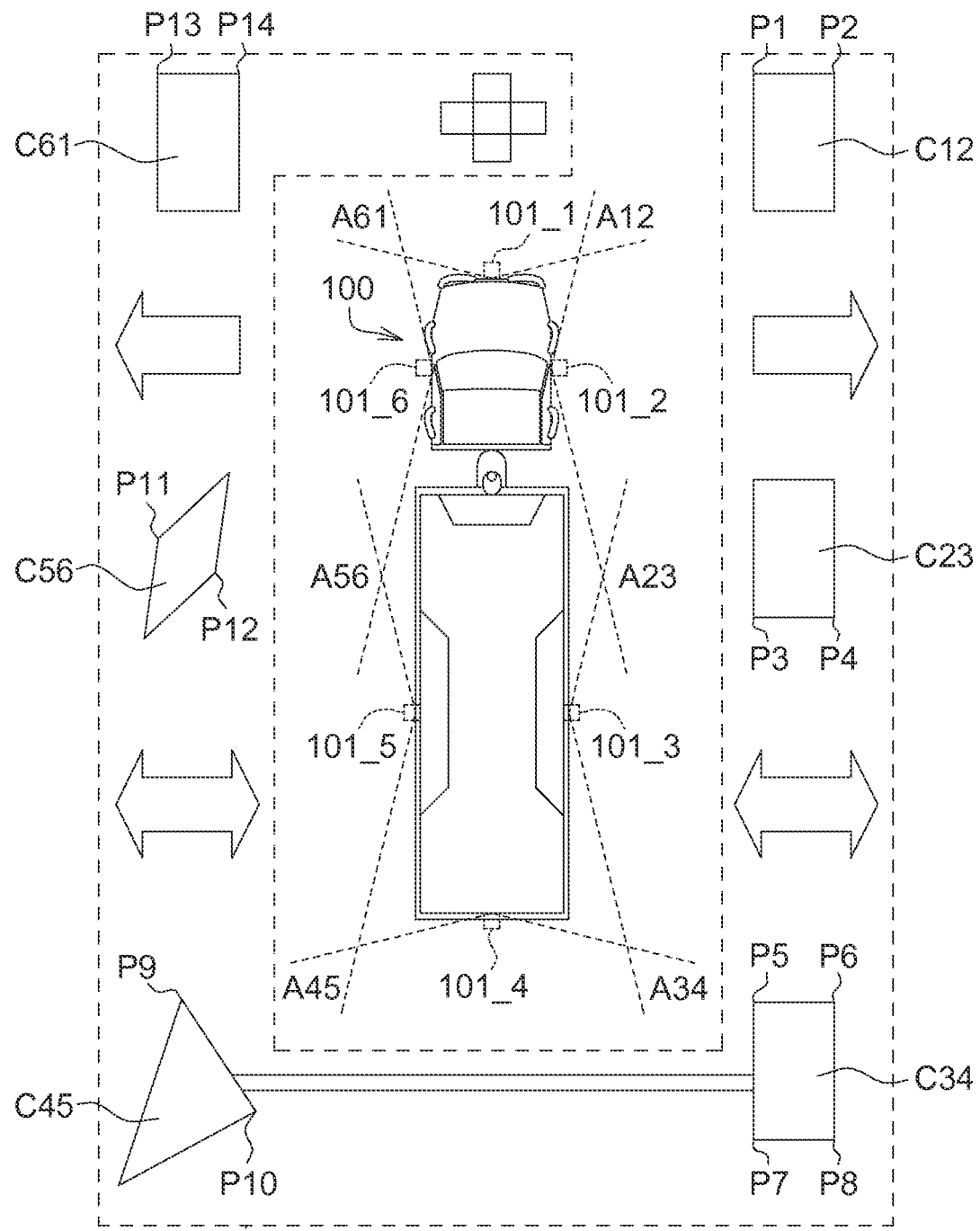
FIG. 7 shows a schematic diagram of a feature point unit 203 according to an embodiment of the disclosure.

For example, the feature point unit 203 provides a feature point according to several geometric patterns spread on the ground surrounding the articulated vehicle 100 as indicated in FIG. 7. Let the overlapping capturing region A12 be taken for example. The feature point unit 203 provides a rectangular object C12, wherein the terminal points of the rectangular object C12 correspondingly form feature points P1 and P2. Likewise, the feature point unit 203 correspondingly provides a rectangular object C23, a rectangular object C34, a triangular object C45, a diamond-shaped object C56 and a rectangular object C61, and the terminal points of these objects correspondingly form feature points P3, P4, P5, . . . , P14 in the overlapping capturing regions A23, A34, A45, A56 and A61.

After the movable carrier 201 makes the angle θ substantially equal to the i-th training angle θt_i and the feature point unit 203 correspondingly provides the feature points P1 to P14 with respect to each of the overlapping capturing regions A12~A61, the control unit 205 correspondingly captures the first to the sixth images Imx_1 to Imx_6 with the image capturers 101_1~101_6, wherein any two adjacent images of the first to the sixth images Imx_1 to Imx_6 respectively show the first and the second feature points.

Figure 16:
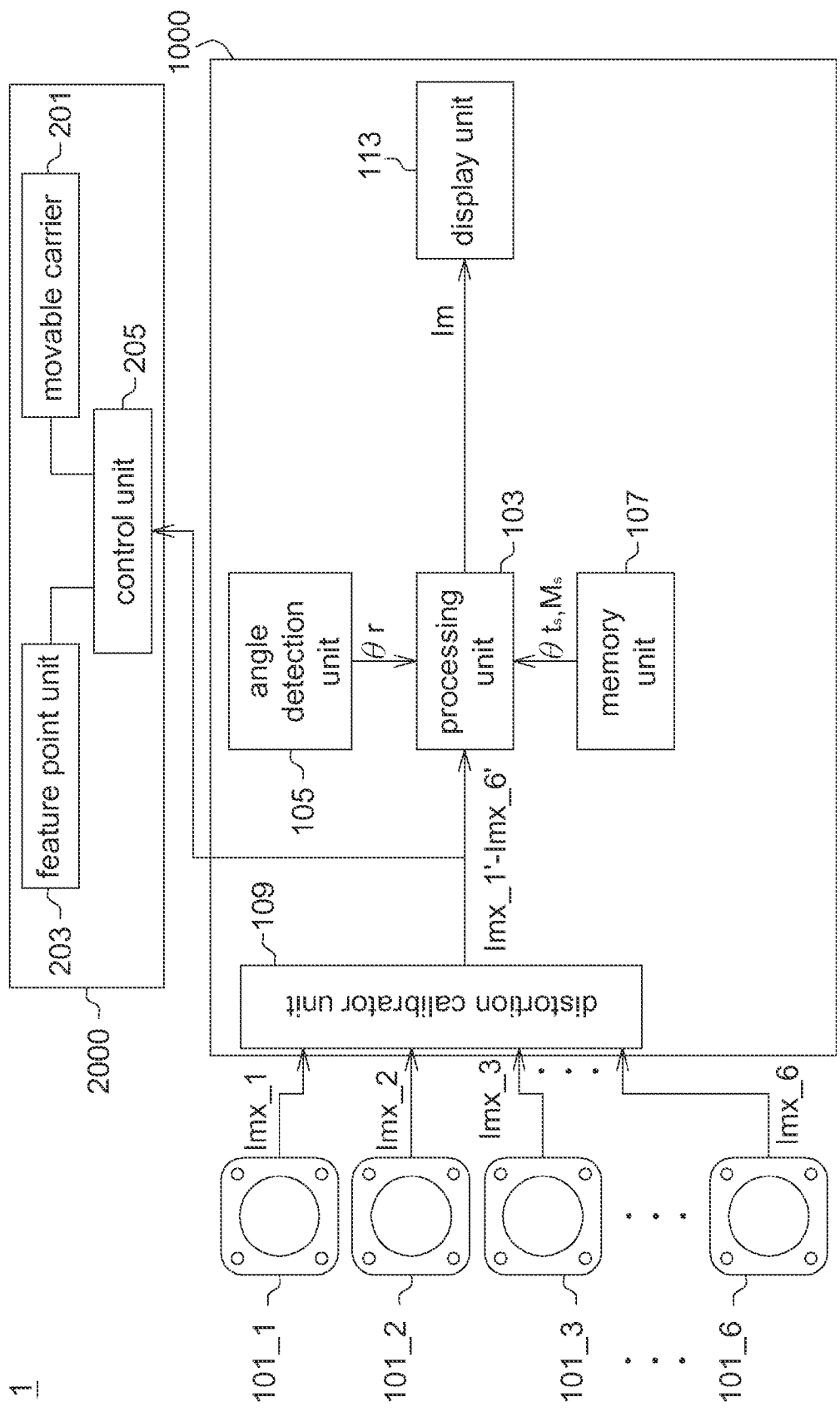
FIG. 16 shows a block diagram of a training system according to another embodiment of the disclosure.

Referring to FIG. 16. In other implementations, the automobile-side device 1000 further includes a distortion calibration unit 109, which electrically connects the image capturers 101_1~101_6 and the control unit 205. The distortion calibration unit 109 correspondingly generates first to sixth calibrated images Imx_1'~Imx_6' from the first to the sixth images Imx_1 to Imx_6, and further provides the first to the sixth calibrated images Imx_1'~Imx_6' to the control unit 205. In other examples, the distortion calibration unit 109 may also be realized in the manner of software correspondingly stored in a computer readable medium, such as a random access memory, a read-only memory or a non-volatile memory. The processing unit 103 of the automobile-side device 1000 correspondingly accesses the computer readable medium to calibrate the distortion of image. Meanwhile, the first to the sixth calibrated images Imx_1'~Imx_6' are provided to the control unit 205 by the processing unit 103.

Figure 8A:
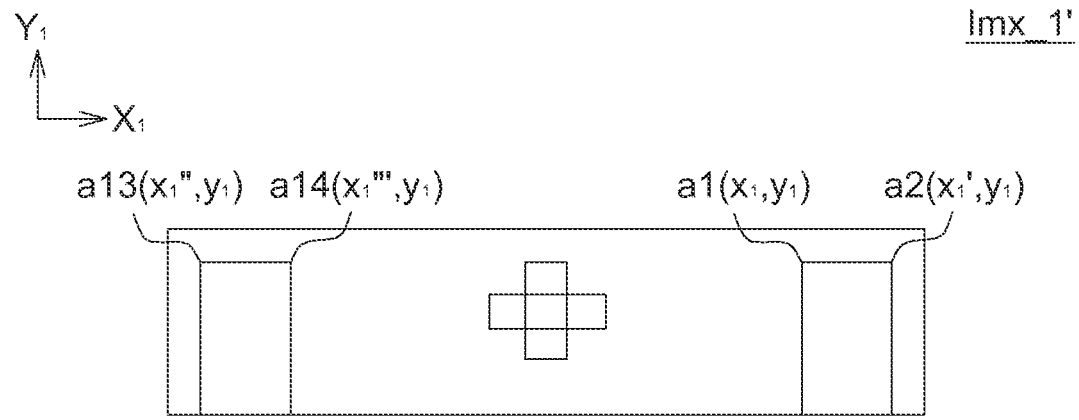
FIGS. 8A to 8F respectively show schematic diagrams of the first to the sixth images Imx_1'~Imx_6'.
Figure 8B:
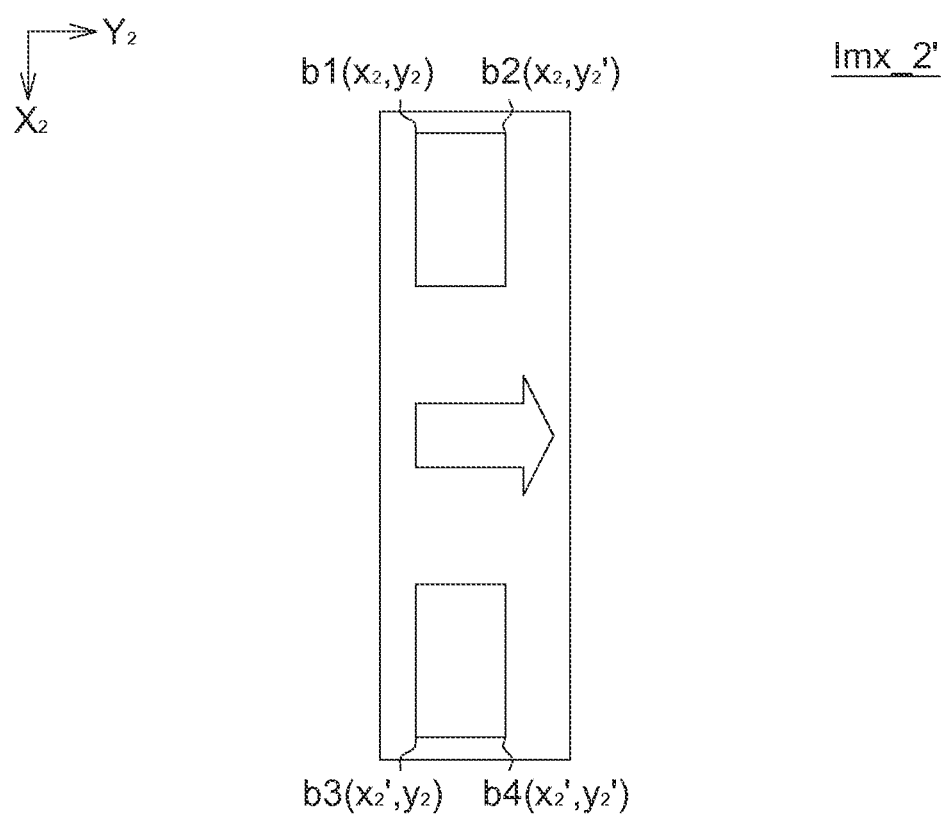
Figure 8C:
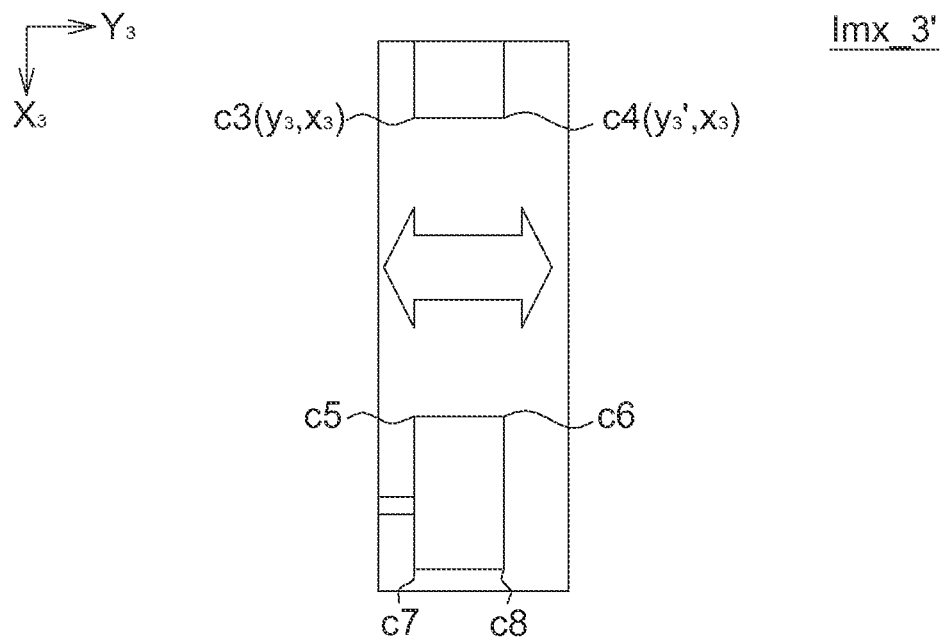
Figure 8D:
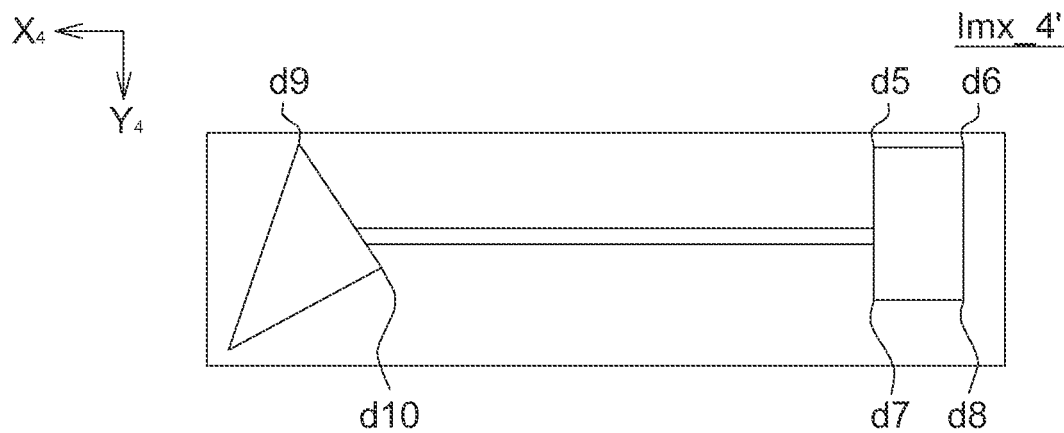
Figure 8E:
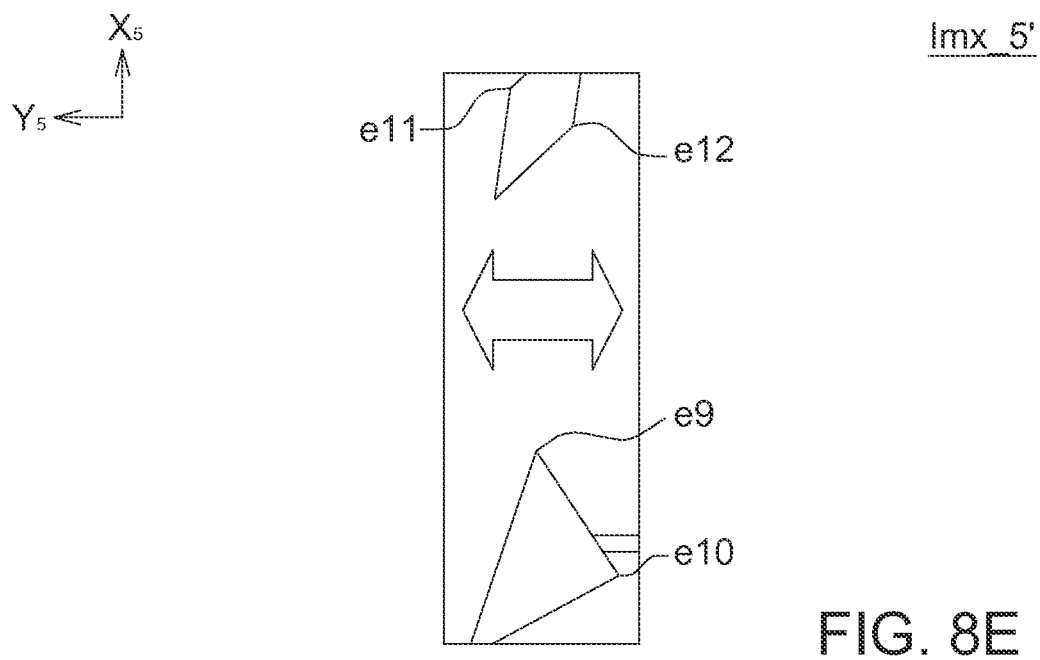
Figure 8F:
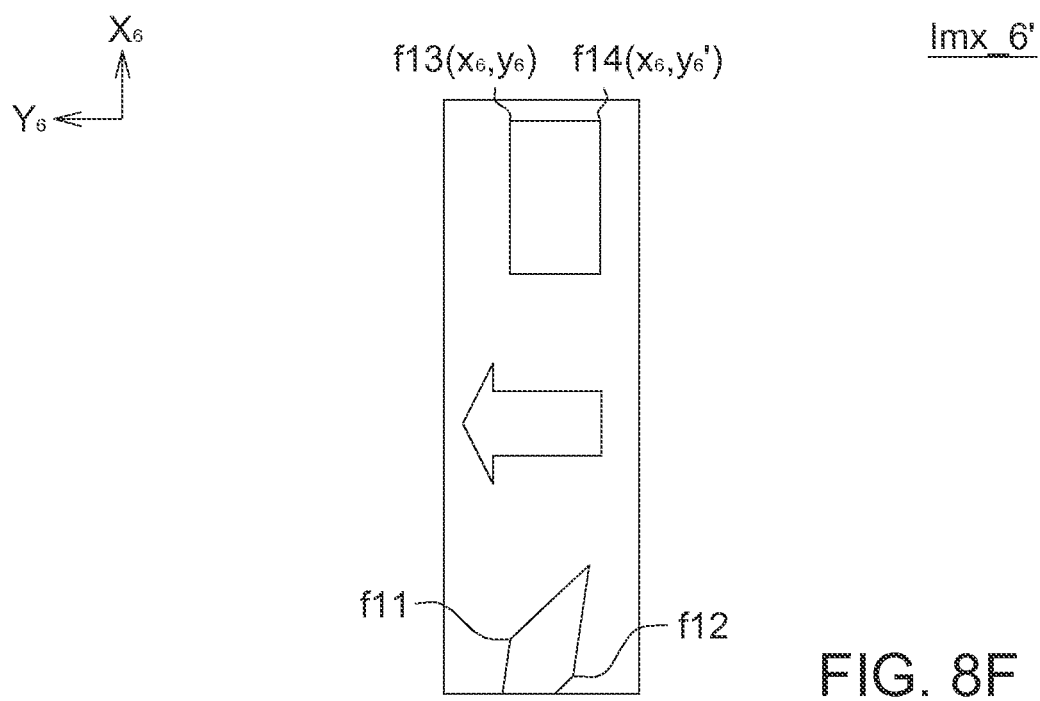

Referring to FIGS. 8A and 8B, schematic diagrams of first and second images Imx_1' and Imx_2' are respectively shown. Le the first and the second images Imx_1' and Imx_2' correspondingly generated by the image capturers 101_1 and 101_2 be taken for example. The first image Imx_1' includes an image object P1_C12, such as the content of the image captured by the image capturer 101_1 with respect to the rectangular feature point object C12. The image object P1_C12 includes the first set of feature points a1 and a2 respectively corresponding to the feature points P1 and P2. Likewise, the second image Imx_2' includes an image object P2_C12, such as the content of the image captured by the image capturer 101_2 with respect to the rectangular feature point object C12. The image object P2_C12 includes the second set of feature points b1 and b2 respectively corresponding to the feature points P1 and P2. The generation of the third to the sixth images Imx_3'~Imx_6' being similar to that of the first and the second images Imx_1' to Imx_2' is illustrated in FIG. 8C to 8F, and is not repeated here.

The control unit 205 receives the first to the sixth images Imx_1'~Imx_6', and the feature point unit 203 provides at least one feature point associated with the overlapping capturing region between any two adjacent images, such that any two adjacent images of the first to the sixth images Imx_1'~Imx_6' correspondingly show a first feature point and a second feature point respectively. The control unit 205 respectively stores the coordinates of two sets of feature points of any two adjacent images, and the two coordinate sets as an i-th feature point comparison table T_i with respect to the i-th training angle θt_i. Let the first and the second images Imx_1' and Imx_2' which are adjacent to each other be taken for example. The control unit 205 stores the coordinates $(x_1, y_1)$ and $(x_1', y_1)$ of the first set of feature points a1 and a2 in the first image Imx_1' and the coordinates $(x_2, y_2)$ and $(x_2, y_2')$ of the second set of feature points b1 and b2 to the i-th feature point comparison table T_i. The coordinates $(x_1, y_1)$ and $(x_1', y_1)$ of the first set of feature points a1 and a2 correspond to the feature points P1 and P2. The coordinates $(x_2, y_2)$ and $(x_2, y_2')$ of the second set of feature points b1 and b2 correspond to the feature points P1 and P2.

Figure 9:
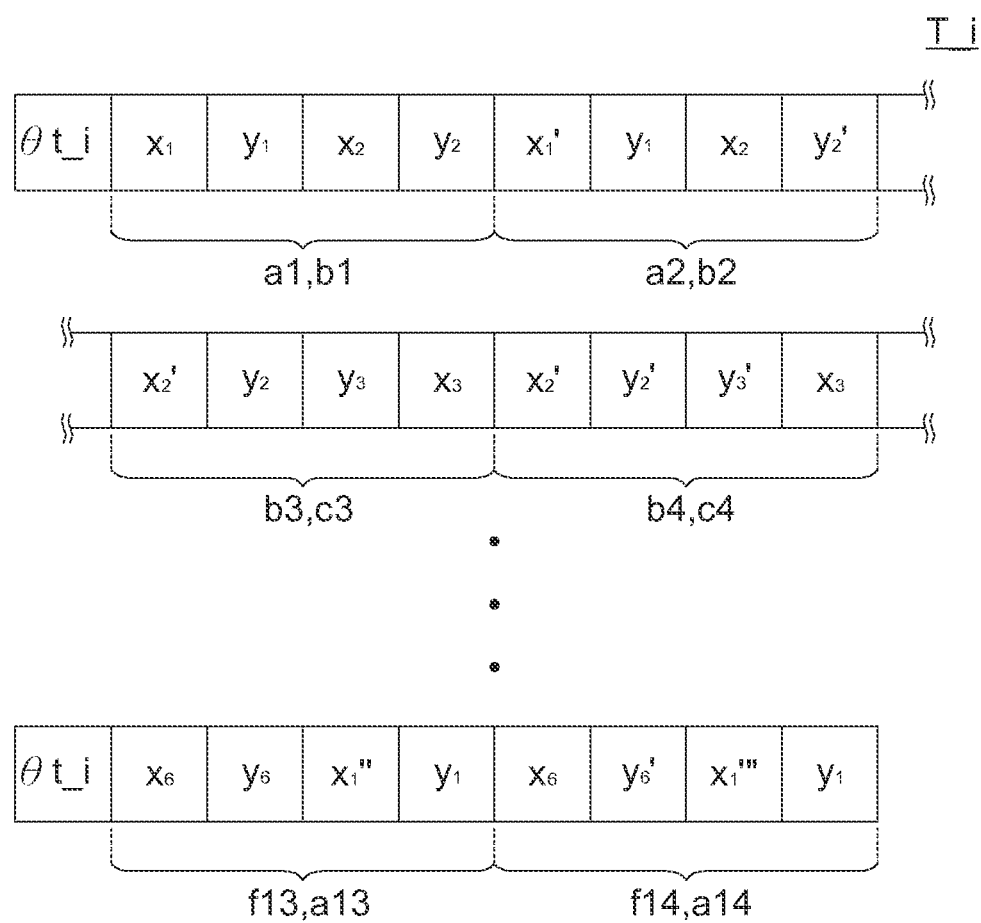
FIG. 9 shows a schematic diagram of comparison table T_i for an i-th feature point.

Likewise, the coordinates of the corresponding feature points b3~b4 and c3~c4 in the second and the third image Imx_2' and Imx_3', the coordinates of the corresponding feature points c5~c8 and d5~d8 in the third and the fourth images Imx_3' and Imx_4', the coordinates of the corresponding feature points d9, d10 and e9, e10 in the fourth and the fifth images Imx_4' and Imx_5', the coordinates of the corresponding feature points e11, e12 and f11, f12 in the fifth and the sixth images Imx_5' and Imx_6', and the coordinates of the corresponding feature points f13, f14 and a13, a14 in the sixth and the first images Imx_6' and Imx_1' are stored to the i-th feature point comparison table T_i. The data structure of the i-th feature point comparison table T_i is similar to the illustration in FIG. 9.

Figure 10:
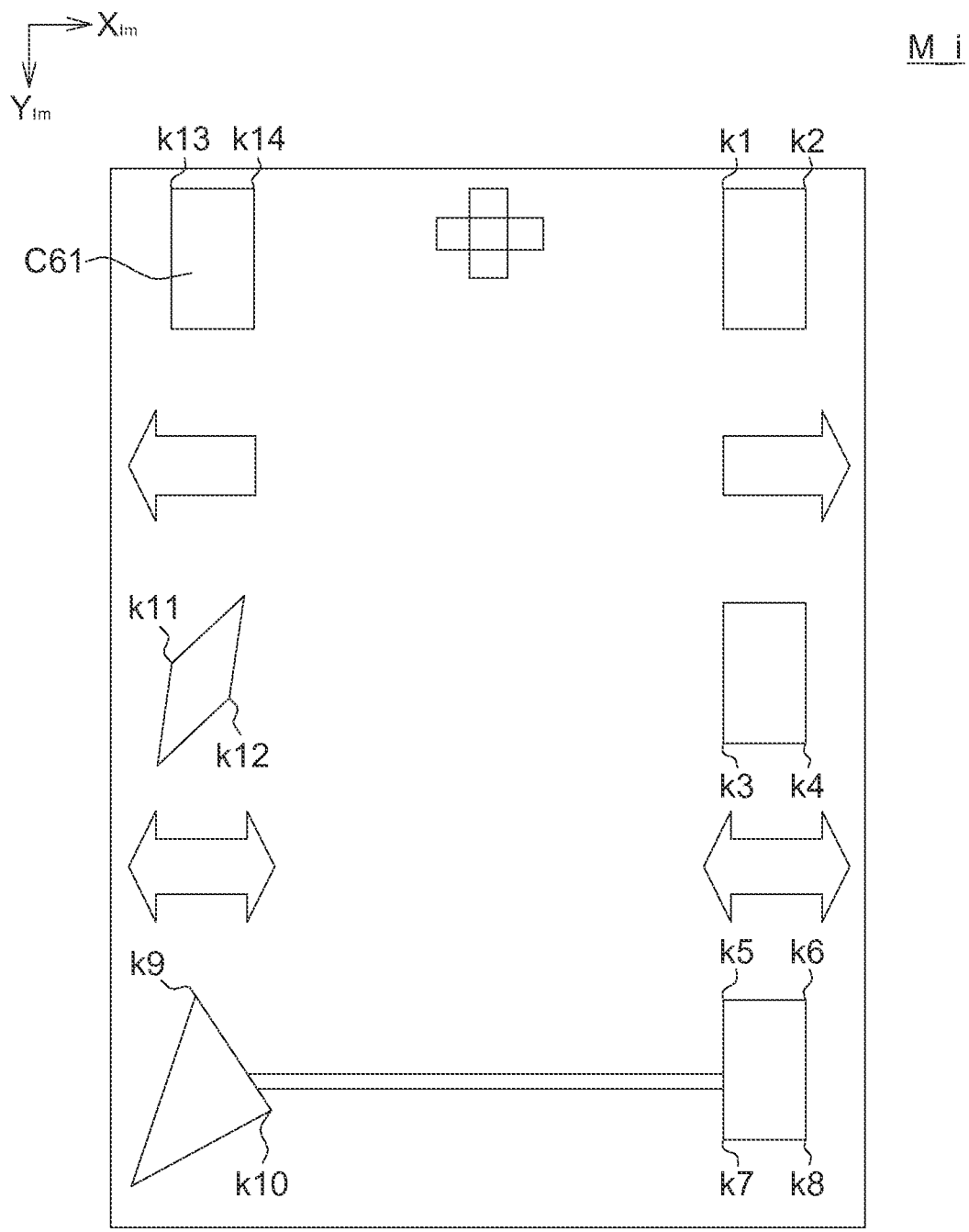
FIG. 10 shows a schematic diagram of an i-th surrounding image model M_i.

The control unit 205 further constructs an i-th surrounding image model M_i according to the i-th feature point comparison table T_i, so as to complete the training process with respect to the i-th training angle θt_i. In the example of the surrounding image model M_i as indicated in FIG. 10, the suturing feature points k1 and k2 are the display images corresponding to the feature points P1 and P2 respectively. Likewise, the suturing feature points k3, k4, . . . , k13 and k14 are the display images corresponding to the feature point P3, P4, . . . , P13 and P14 respectively.

For example, the control unit 205 includes an equalizer, and obtains the weighted parameters W1 and W2 according to the position information of a suturing feature point corresponding to the first and the second feature points in the i-th surrounding image model M_i. The equalizer further obtains the pixel data of the suturing feature point by performing an image equalization process on the first and the second feature points according to the two weighted parameters W1 and W2 so as to complete the image equalization process.

Figure 11:
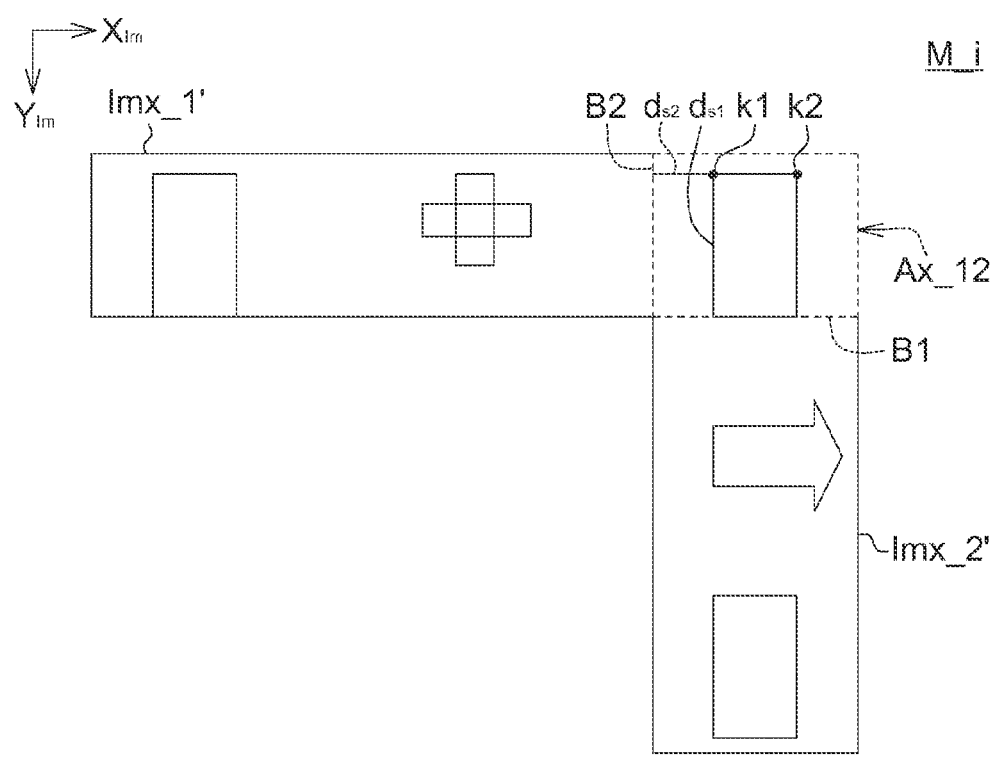
FIG. 11 shows a schematic diagram of the operation of an equalizer.

Next, the operation of the equalizer is exemplified by the equalization of the suturing feature point k1. Referring to FIG. 11, a schematic diagram of the operation of an equalizer is shown. The i-th surrounding image model M_i is generated according to the first to the sixth images Imx_1'~Imx_6'. Any two adjacent images of the first to the sixth images Imx_1'~Imx_6' may overlap with each other to form an image suturing region. Let the first and the second images Imx_1' and Imx_2' be taken for example. The first and the second images Imx_1' and Imx_2' may overlap with each other to form an image suturing region Ax_12, wherein the image suturing region Ax_12 correspondingly has boundaries B1 and B2, which are determined by the first and the second images Imx_1' and Imx_2' respectively.

The equalizer obtains a distance ds1 between the suturing feature point k1 and the boundary B1 and a distance ds2 between the suturing feature point k1 and the boundary B2, and accordingly determines the weighted parameters W1 and W2. For example, the weighted parameters W1 and W2 respectively satisfy the following equations:

$$W1 = \frac{ds2}{ds1 + ds2}$$

$$W2 = \frac{ds1}{ds1 + ds2}$$

Based on the following equations, the equalizer further obtains a weighted sum of the first and the second feature points (that is, the feature points a1 and b1) according to the weighted parameters W1 and W2, and accordingly determines the pixel value of the suturing feature point k1 as:

$$k1 = W1 \times a1 + W2 \times b1$$

Based on similar operations, the equalizer further performs the same equalization process with respect to each of the suturing feature points k2~k14 of the i-th surrounding image model M_i so as to complete the operation of the i-th surrounding image model M_i.

After the surrounding image model M_i corresponding to the i-th training angle $\theta t\_i$ is obtained, the control unit 205 further adjusts the parameter i, so as to obtain N surrounding image models M_1~M_N corresponding to the N training angles $\theta t\_1$~$\theta t\_N$ respectively in the training stage. The N surrounding image models M_1~M_N are provided to the automobile-side device 1000 and correspondingly stored to the memory unit 107 of the automobile-side device 1000. In other examples, the control unit 205 is electrically connected to the memory unit 107 for storing the surrounding image model M_i to the memory unit 107.

Let an operational example be taken for example. The control unit 205 sets the initial value of the parameter i as 1. After the training process corresponding to the i-th training angle $\theta t\_i$ is completed, the control unit 205 further determines whether the parameter i is equal to N. If i is equal to N, this indicates that the training device 2000 has completed the corresponding training process with respect to N training angles $\theta t\_1$~$\theta t\_N$.

Conversely, when i is not equal to N, this indicates that the training device 2000 has not yet completed the corresponding training process with respect to N training angles $\theta t\_1$~$\theta t\_N$. Thus, the control unit 205 increases the value of i by 1, and drives the training device 2000 to perform a training process with respect to the next training angle.

Figure 12:
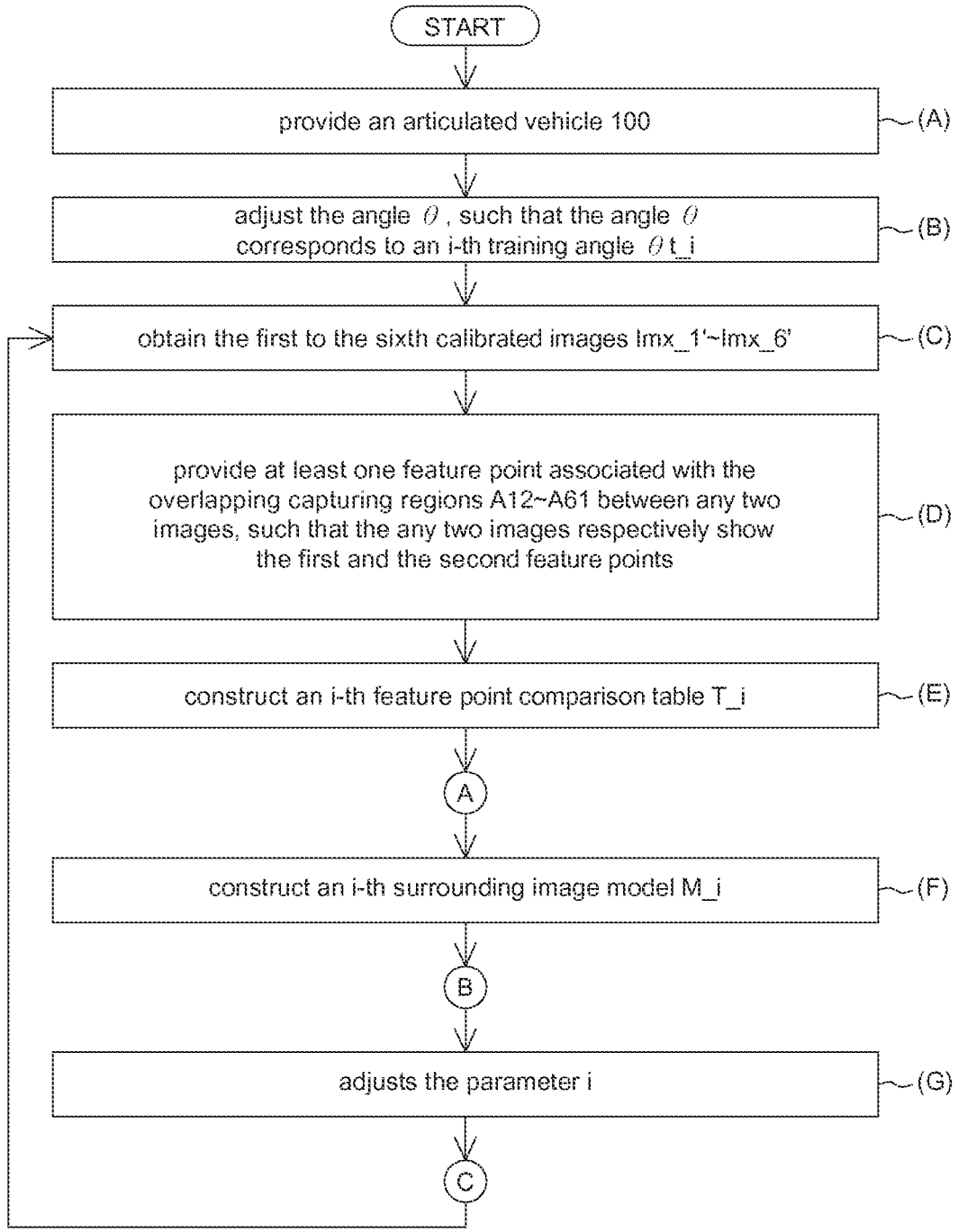
FIG. 12 shows a flowchart of a training method according to an embodiment of the disclosure.

Referring to FIG. 12, a flowchart of a training method according to an embodiment of the disclosure is shown. For example, the training method of the embodiment of the disclosure is for use in a training system including the automobile-side device 1000 and the training device 2000. The training method of the embodiment of the disclosure includes the following steps. Firstly, as indicated in step (A), the articulated vehicle 100 is provided. Next, as indicated in step (B), the control unit 205 determines N training angles $\theta t\_1$~$\theta t\_N$, and moves one of the first and the second body parts 11 and 15 by the movable carrier 201 to adjust the angle θ, such that the angle θ corresponds to an i-th training angle $\theta t\_i$ of N training angles $\theta t\_1$~$\theta t\_N$.

Then, as indicated in step (C), the control unit 205 captures the first to the sixth images Imx_1 to Imx_6 by the image capturers 101_1~101_6 disposed on the first to the sixth surfaces S1~S6 respectively, and obtains the first to the sixth calibrated images Imx_1'~Imx_6' by the distortion calibration unit 109. Next, as indicated in step (D), when the angle θ corresponds to the i-th training angle $\theta t\_i$, the feature point unit 203 provides at least one feature point associated with the overlapping capturing regions A12~A61 between any two images of the first to the sixth images Imx_1'~Imx_6', such that the any two images of the first to the sixth images Imx_1'~Imx_6' respectively show the first and the second feature points, such as the feature points a1 and b1.

Then, as indicated in step (E), the control unit 205 records two coordinate sets of the first and the second feature points in any two images so as to construct an i-th feature point comparison table T_i with respect to the i-th training angle $\theta t\_i$. Next, as indicated in step (F), the control unit 205 constructs an i-th surrounding image model M_i according to the i-th feature point comparison table T_i. Then, as indicated in step (G), the control unit 205 adjusts the parameter i, and repeats steps (C)~(F) to obtain N surrounding image models M_1~M_N corresponding to the N training angles $\theta t\_1$~$\theta t\_N$ respectively.

Figure 13:
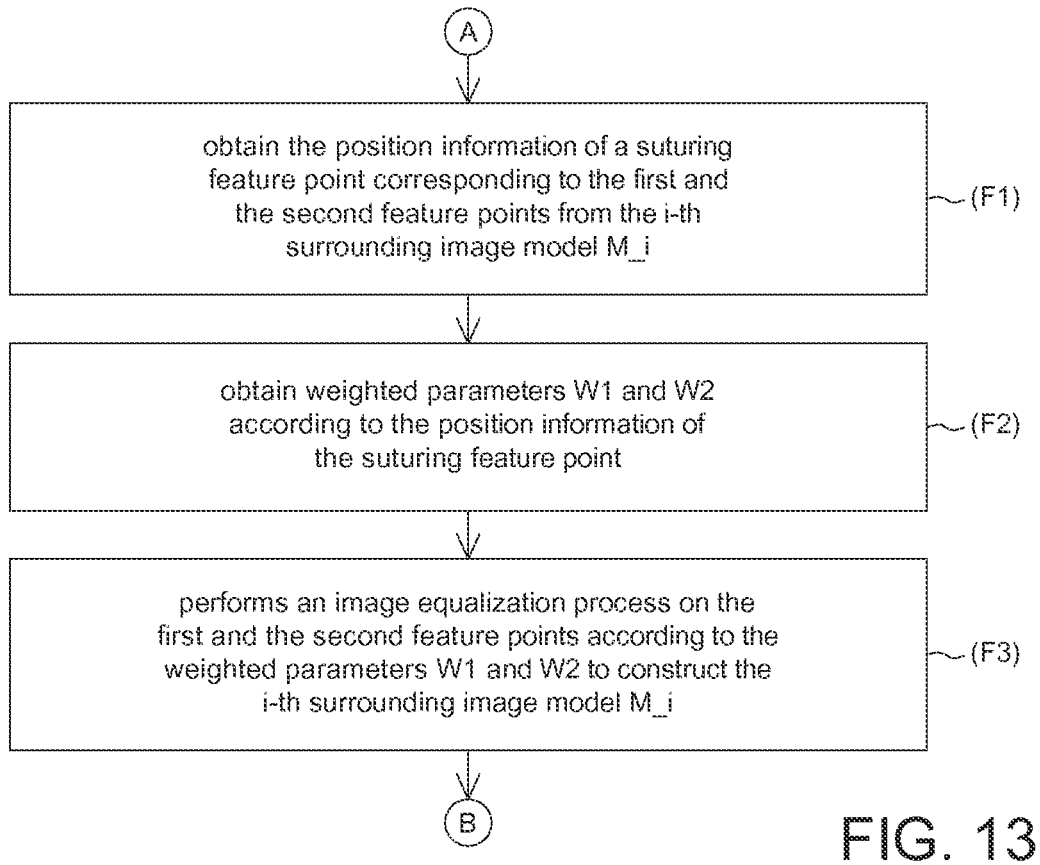
FIG. 13 shows a detailed flowchart of a training method according to an embodiment of the disclosure.

Referring to FIG. 13, a detailed flowchart of a training method according to an embodiment of the disclosure is shown. For example, the step (F) of the training method further includes sub-steps (F1)~(F3). In sub-step (F1), the equalizer of the control unit 205 obtains the position information of a suturing feature point (such as the suturing feature point k1) corresponding to the first and the second feature points (such as the feature point a1 and b1) from the i-th surrounding image model M_i. In sub-step (F2), the equalizer obtains weighted parameters W1 and W2 according to the position information of the suturing feature point.

In sub-step (F3), the equalizer performs an image equalization process on the first and the second feature points according to the weighted parameters W1 and W2 to construct the i-th surrounding image model M_i corresponding to the i-th training angle $\theta t\_i$.

Figure 14:
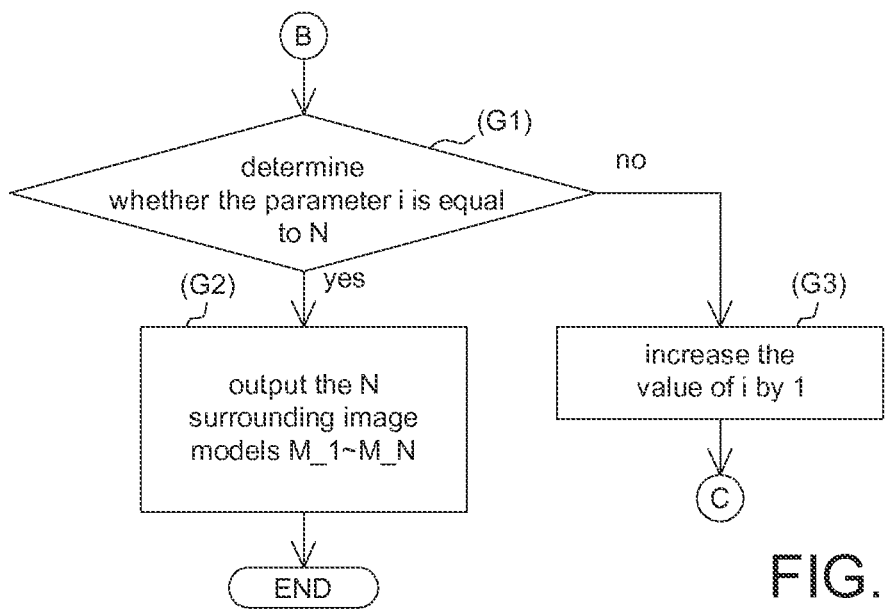
FIG. 14 shows another detailed flowchart of a training method according to an embodiment of the disclosure.

Referring to FIG. 14, another detailed flowchart of a training method according to an embodiment of the disclosure is shown. For example, the control unit 205 sets the initial value of the parameter i as 1. The step (G) of the training method includes sub-steps (G1)~(G3). In sub-step (G1), the control unit 205 determines whether the parameter i is equal to N after step (F). If i is equal to N, then the method proceeds to step (G2), the N surrounding image models M_1~M_N are outputted to the automobile-side device 1000, and the training method of the embodiment of the disclosure terminates. Conversely, if i is not equal to N, then the method proceeds to step (G3), the control unit 205 increases the value of i by 1, and repeats step (C) to perform a training process with respect to the next training angle.

The embodiment of the disclosure is exemplified by the situation that the feature point unit 203 provides the feature point object with respect to each of the overlapping capturing regions A12, A23, A34, A45, A56 and A61. However, the feature point unit 203 of the embodiment of the disclosure is not limited thereto. For example, the feature point unit 203 of the embodiment of the disclosure may provide different feature point objects with respect to non-overlapping capturing regions to facilitate corresponding distortion calibration processes.

The automobile-side device of the embodiment of the disclosure may further detect a measurement of the angle between the first body part and the second body part with the angle detection unit. The automobile-side device further looks up the existing angle-to-surrounding-image model table according to the angle measurement to correspondingly obtain a selected training angle closest to the angle measurement and a selected surrounding image model corresponding to the selected training angle. The automobile-side device correspondingly captures the 6 images by the 6 image capturers disposed on the 6 surfaces surrounding the vehicle body. The automobile-side device of the embodiment of the disclosure further obtains the practical operating surrounding image corresponding to the articulated vehicle according to the 6 images and the selected surrounding image model. In comparison to the conventional driving aids, the automobile-side device of the embodiment of the disclosure has the advantage of providing surrounding images to the articulated vehicle more effectively.

In the training stage, the training device of the embodiment of the disclosure may adjust the angle between two vehicle bodies of the articulated vehicle via a movable carrier, such that the angle correspondingly corresponds to the i-th predetermined training angle of N predetermined training angle, wherein i is an integral smaller than or equal to N. The training device of the embodiment of the disclosure may provide a feature point associated with the overlapping capturing region of any two images of the 6 images with the feature point unit, and constructs an i-th feature point comparison table corresponding to the i-th predetermined training angle according to two corresponding feature points in the two images. The training device of the embodiment of the disclosure may further adjust the parameter i to construct and provide N surrounding image models corresponding to the N predetermined training angles to the automobile-side device. Thus, the training device of the embodiment of the disclosure may effectively construct N surrounding image models corresponding to N different predetermined angles by means of training process, such that the corresponding automobile-side device may generate a surrounding bird view image according to the N surrounding image models.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A training system for an articulated vehicle, wherein the articulated vehicle comprises a first body part, a second body part and a connection part, the proceeding direction of the first body part forms an angle with respect to the proceeding direction of the second body part; the first body part comprises a first connection surface, a first surface, a second surface and a sixth surface, the first surface is opposite to the first connection surface and adjacent to the second and the sixth surfaces; the second body part comprises a second connection surface, a third surface, a fourth surface and a fifth surface, the second connection surface is connected to the first connection surface via the connection part, the fourth surface is opposite to the second connection surface and adjacent to the third and the fifth surfaces, the second surface is adjacent to the third surface, and the fifth surface is adjacent to the sixth surface; the first to the sixth image capturers are respectively disposed on the first to the sixth surfaces for capturing the first to the sixth images, the first image partly overlaps the second and the sixth images, the fourth image partly overlaps the third and the fifth images, the second image partly overlaps the third image, and the fifth image partly overlaps the sixth image; the training system comprises:

an automobile-side device; and
a training device connected to the articulated vehicle in a training stage,
wherein the training device comprises:
  a movable carrier used for moving one of the first and the second body parts to adjust the angle, such that the angle corresponds to an i-th training angle of N training angles, wherein i is an integral smaller than or equal to N;
  a feature point unit, wherein when the angle corresponds to the i-th training angle, the feature point unit provides at least one feature point associated with the overlapping capturing region between any two adjacent images of the first to the sixth images, such that the any two adjacent images correspondingly show a first feature point and a second feature point; and
  a control unit used for determining the N training angles so as to correspondingly drive the movable carrier, wherein the control unit receives the first to the sixth images provided by the processing unit, and respectively records two coordinate sets of the first and the second feature points in any two adjacent images to construct an i-th feature point comparison table with respect to the i-th training angle, and the control unit further constructs an i-th surrounding image model according to the i-th feature point comparison table so as to perform a training process with respect to the i-th training angle;
wherein the control unit further adjusts the parameter i to obtain N surrounding image models respectively corresponding to the N training angles in the training stage and provide the N surrounding image models to the automobile-side device.

2. The training system according to claim 1, wherein the control unit further comprises:
an equalizer used for obtaining two weighted parameters according to a suturing feature point corresponding to the first and the second feature points in the i-th surrounding image model, wherein the equalizer further performs an image equalization process on the first and the second feature points in the any two images according to the two weighted parameters to construct the i-th surrounding image model corresponding to the i-th training angle.

3. The training system according to claim 1, wherein the control unit sets the initial value of the parameter i as 1, and following the training process with respect to the i-th training angle, the control unit further determines whether the parameter i is equal to N, and when i is not equal to N, the control unit increase the value of i by 1, and drives the training device to perform a training process with respect to the next i-th training angle.

4. The training system according to claim 1, wherein the automobile-side device further comprises: a processing unit used for receiving the first to the sixth images, and providing a practical operating surrounding image corresponding to the articulated vehicle according to the N surrounding image models in a practical operating stage.

5. The training system according to claim 4, wherein the automobile-side device further comprises:
 a memory unit used for storing an angle-to-surrounding-image model table, which comprises the N training angles and the N surrounding image models corresponding to the N training angles;
 a display unit; and
 an angle detection unit used for detecting the angle in the practical operating stage and correspondingly providing an angle measurement;
 wherein the processing unit accesses the angle-to-surrounding-image model table so as to obtain a selected training angle closest to the angle measurement from the N training angles, and obtain a selected surrounding image model corresponding to the selected training angle from the N surrounding image models;
 wherein the processing unit receives the first to the sixth practical captured images respectively captured by the first to the sixth image capturers in the practical operating stage, and obtain the practical operating surrounding image by processing the first to the sixth practical captured images with the selected surrounding image model and drive the display unit to display the practical operating surrounding image.

6. The training system according to claim 5, wherein the automobile-side device further comprises:
 a distortion calibration unit used for performing a distortion calibration process on the first to the sixth practical captured images respectively captured by the first to the sixth image capturers, and providing the first to the sixth calibrated practical captured images to the processing unit;
 wherein the processing unit obtains the practical operating surrounding image by processing the first to the sixth calibrated practical captured images with the selected surrounding image model and drives the display unit to display the practical operating surrounding image.

7. The training system according to claim 1, wherein the automobile-side device further comprises:
 a distortion calibration unit used for performing a distortion calibration process on the first to the sixth practical images respectively captured by the first to the sixth image capturers in the training stage and providing the first to the sixth calibrated images to the training device.

8. An automobile-side device, comprising:
 a memory unit used for storing an angle-to-surrounding-image model table, which comprises N training angles and N surrounding image models corresponding to the N training angles, wherein N is an integral greater than 1;
 an angle detection unit used for detecting a angle and correspondingly providing an angle measurement; and
 a processing unit used for accessing the angle-to-surrounding-image model table so as to obtain a selected training angle closest to the angle measurement from the N training angles, and obtain a selected surrounding image model corresponding to the selected training angle from the N surrounding image models;
 wherein the automobile-side device is used in an articulated vehicle which providing a practical operating surrounding image, wherein the articulated vehicle comprises a first body part, a second body part and a connection part, the proceeding direction of the first body part forms the angle with respect to the proceeding direction of the second body part; the first body part comprises a first connection surface, a first surface, a second surface and a sixth surface, the first surface is opposite to the first connection surface and adjacent to the second and the sixth surfaces; the second body part comprises a second connection surface, a third surface, a fourth surface and a fifth surface, the second connection surface is connected to the first connection surface via the connection part, the fourth surface is opposite to the second connection surface and adjacent to the third and the fifth surfaces, the second surface is adjacent to the third surface, and the fifth surface is adjacent to the sixth surface; the first to the sixth image capturers are respectively disposed on the first to the sixth surfaces for capturing a first to a sixth practical captured images, the first practical captured image partly overlaps the second and the sixth practical captured images, the fourth practical captured image partly overlaps the third and the fifth practical captured images, the second practical captured image partly overlaps the third practical captured image, the fifth practical captured image partly overlaps the sixth practical captured image;
 wherein the processing unit further receives the first to the sixth practical captured images, and obtains the practical operating surrounding images by processing the first to the sixth practical captured images with the selected surrounding image models.

9. The automobile-side device according to claim 8, further comprising:
 a display unit used for receiving and displaying the practical operating surrounding image.

10. The automobile-side device according to claim 8, further comprising:
 a distortion calibration unit used for performing a distortion calibration process on the first to the sixth practical captured images, and providing the first to the sixth calibrated practical captured images to the processing unit;
 wherein the processing unit obtains the practical operating surrounding image by processing the first to the sixth calibrated practical captured images with the selected surrounding image model and drives the display unit to display the practical operating surrounding image.

11. A training method for a training device, wherein the training method comprises:
 providing an articulated vehicle, comprising a first body part, a second body part and a connection part, wherein the proceeding direction of the first body part forms an angle with respect to the proceeding direction of the second body part; the first body part comprises a first connection surface, a first surface, a second surface and a sixth surface, the first surface is opposite to the first connection surface and adjacent to the second and the sixth surfaces; the second body part comprises a second connection surface, a third surface, a fourth surface and a fifth surface, the second connection surface is connected to the first connection surface via the connection part, the fourth surface is opposite to the second connection surface and adjacent to the third and the fifth surfaces, the second surface is connected to the third surface, and the fifth surface is adjacent to the sixth surface;

moving one of the first and the second body parts by a movable carrier of the training device to adjust the angle, such that the angle corresponds to an i-th training angle of N training angles, wherein i is an integral smaller than or equal to N;

respectively capturing first to six images by first to sixth image capturers disposed on the first to the sixth surfaces when the angle corresponds to the i-th training angle, wherein the first image partly overlaps the second and the sixth images, the fourth image partly overlaps the third and the fifth images, the second image partly overlaps the third image, and the fifth image partly overlaps the sixth image;

providing at least one feature point associated with an overlapping capturing region between any two adjacent images of the first to the sixth images by a feature point unit of the training device when the angle corresponds to the i-th training angle, such that any two adjacent images of the first to the sixth images correspondingly display a first feature point and a second feature point respectively;

respectively recording two coordinate sets of the first and the second feature points in the any two adjacent images by a control unit of the training device to construct an i-th feature point comparison table with respect to the i-th training angle;

constructing an i-th surrounding image model by the control unit according to the i-th feature point comparison table, so as to perform a training process with respect to the i-th training angle; and adjusting the parameter i by the control unit to obtain N surrounding image models respectively corresponding to the N training angles.

12. The training method according to claim 11, wherein the step of constructing the i-th surrounding image model further comprises:

obtaining the position information of a suturing feature point corresponding to the first and the second feature points in the i-th surrounding image model by an equalizer of the control unit;

respectively obtaining two weighted parameters by the equalizer according to the position information of the suturing feature point; and performing an image equalizing process on the first and the second feature points in the any two images by the equalizer according to the two weighted parameters so as to construct the i-th surrounding image model corresponding to the i-th training angle.

13. The training method according to claim 11, wherein the step of adjusting the parameter i further comprises:

setting the initial value of the parameter i as 1 by the control unit;

determining whether the parameter i is equal to N by the control unit following the training process with respect to the i-th training angle; and increasing the value of i by 1 and performing a training process with respect to the next i-th training angle by the control unit when i is not equal to N.

14. The training method according to claim 11, further comprising a practical operating stage during which an automobile-side device of the articulated vehicle provides a practical operating surrounding image corresponding to the articulated vehicle according to the N surrounding image models.

15. The training method according to claim 14, wherein the training method further comprises:

storing an angle-to-surrounding-image model table by a memory unit of the automobile-side device, which comprises the N training angles and the N surrounding image models corresponding to the N training angles;

detecting the angle and correspondingly providing an angle measurement by an angle detection unit of the automobile-side device in the practical operating stage;

accessing the angle-to-surrounding-image model table by a processing unit of the automobile-side device so as to obtain a selected training angle closest to the angle measurement from the N training angles and obtaining a selected surrounding image model corresponding to the selected training angle from the N surrounding image models;

respectively capturing first to sixth practical captured images by the first to the sixth image capturers; and obtaining and displaying the practical operating surrounding image by the processing unit to process the first to the sixth practical captured images with the selected surrounding image model.

16. The training method according to claim 15, wherein following the step of capturing first to sixth practical captured images, the method further comprises:

performing a distortion calibration process on the first to the sixth practical captured images and providing the first to the sixth calibrated practical captured images to the processing unit by a distortion calibration unit of the automobile-side device;

wherein in the step of obtaining the practical operating surrounding image and driving the display unit to display the practical operating surrounding image, the first to the sixth calibrated practical captured images are processed with the selected surrounding image model.

17. The training method according to claim 11, wherein following the step of capturing the first to the sixth images, the method further comprises:

performing a distortion calibration process on the first to the sixth practical images respectively captured by the first to the sixth image capturers by a distortion calibration unit of the automobile-side device in the training stage, and providing the first to the sixth calibrated images to the processing unit;

wherein in the step of providing the at least one feature point, the at least one feature point associated with the overlapping capturing region between any two images of the first to the sixth calibrated images is provided.

18. A surrounding bird view image generation method for use in an automobile-side device of an articulated vehicle, wherein the articulated vehicle comprises a first body part, a second body part and a connection part, the proceeding direction of the first body part forms an angle with respect to the proceeding direction of the second body part; the first body part comprises a first connection surface, a first surface, a second surface and a sixth surface, the first surface is opposite to the first connection surface and adjacent to the second and the sixth surfaces; the second body part comprises a second connection surface, a third surface, a fourth surface and a fifth surface, the second connection surface is connected to the first connection surface via the connection part, the fourth surface is opposite to the second connection surface and adjacent to the third and the fifth surfaces, the second surface is adjacent to the third surface, the fifth surface is adjacent to the sixth surface, and the surrounding bird view image generation method comprises:

providing an angle-to-surrounding-image model table by a memory unit of the automobile-side device, which comprises N training angles and N surrounding image models corresponding to the N training angles, wherein N is an integral greater than 1;

detecting the angle and correspondingly providing an angle measurement by an angle detection unit of the automobile-side device;

accessing the angle-to-surrounding-image model table by a processing unit of the automobile-side device so as to obtain a selected training angle closest to the angle measurement from the N training angles, and obtain a selected surrounding image model corresponding to the selected training angle from the N surrounding image models;

respectively capturing first to sixth practical captured images via first to sixth image capturers disposed on the first to the sixth surfaces, wherein the first practical captured image partly overlaps the second and the sixth practical captured images, the fourth practical captured image partly overlaps the third and the fifth practical captured images, the second practical captured image partly overlaps the third practical captured image, and the fifth practical captured image partly overlaps the sixth practical captured image; and obtaining a practical operating surrounding image by the processing unit to process the first to the sixth practical captured images with the selected surrounding image model.

19. The surrounding bird view image generation method according to claim 18, further comprising:

displaying the practical operating surrounding image by using a display unit.

20. The surrounding bird view image generation method according to claim 18, further comprising:

performing a distortion calibration process on the first to the sixth practical captured images and providing the first to the sixth calibrated practical captured images to the processing unit by a distortion calibration unit of the automobile-side device;

wherein in the step of obtaining the practical operating surrounding image, the first to the sixth calibrated practical captured images are processed with the selected surrounding image model.

* * * * *